United States Patent
Fanara

(10) Patent No.: US 9,435,257 B2
(45) Date of Patent: Sep. 6, 2016

(54) HCCI ROTARY ENGINE WITH VARIABLE COMPRESSION RATIO CONTROL

(71) Applicant: Roberto Fanara, Mississauga (CA)

(72) Inventor: Roberto Fanara, Mississauga (CA)

(73) Assignee: Customachinery Inc., Mississauga, Ontario (CA)

( * ) Notice: Subject to any disclaimer, the term of this patent is extended or adjusted under 35 U.S.C. 154(b) by 0 days.

(21) Appl. No.: 14/763,319

(22) PCT Filed: Mar. 25, 2015

(86) PCT No.: PCT/CA2015/050229
§ 371 (c)(1),
(2) Date: Jul. 24, 2015

(87) PCT Pub. No.: WO2015/149167
PCT Pub. Date: Oct. 8, 2015

(65) Prior Publication Data
US 2016/0146009 A1    May 26, 2016

Related U.S. Application Data

(60) Provisional application No. 62/034,155, filed on Aug. 7, 2014, provisional application No. 61/973,989, filed on Apr. 2, 2014.

(51) Int. Cl.
| | | |
|---|---|---|
| F02B 55/14 | (2006.01) |
| F02B 53/10 | (2006.01) |
| F02B 53/06 | (2006.01) |
| F01C 21/08 | (2006.01) |
| F01C 1/356 | (2006.01) |
| F01C 20/20 | (2006.01) |

(52) U.S. Cl.
CPC ............... *F02B 55/14* (2013.01); *F01C 20/20* (2013.01); *F01C 21/089* (2013.01); *F02B 53/06* (2013.01); *F02B 53/10* (2013.01); *F01C 1/3564* (2013.01)

(58) Field of Classification Search
CPC .... F01C 1/3564; F01C 21/089; F01C 20/20; F02B 53/06; F02B 53/10
See application file for complete search history.

(56) References Cited

U.S. PATENT DOCUMENTS

| | | |
|---|---|---|
| 3,981,637 A | 9/1976 | Fischer |
| 5,203,297 A | 4/1993 | Iversen |
| 7,784,303 B2 | 8/2010 | Sakitani et al. |
| 2011/0023814 A1* | 2/2011 | Shkolnik ............ F01C 21/0809 123/210 |
| 2011/0247583 A1 | 10/2011 | Shkolnik et al. |

OTHER PUBLICATIONS

International Search Report and Written Opinion from PCT Application Serial No. PCT/CA2015/050229, dated Jun. 9, 2015, 7 pages.

* cited by examiner

*Primary Examiner* — Mary A Davis
(74) *Attorney, Agent, or Firm* — Kinney & Lange, P.A.

(57) ABSTRACT

There is provided an apparatus for regulating a compression ratio of an HCCI rotary engine. The engine has a rotor piston rotatable in an operating direction. The stator has one or more combustion chamber throughways, each having at least first and second interior walls. The apparatus comprises, within each combustion chamber throughway, an expansion gate slidably received within the throughway and slidably engaged with and adjacent to the first interior wall, a combustion gate slidably engaged with and adjacent to the expansion gate in the operating direction, and a compression gate slidably engaged with and adjacent to both the combustion gate and the second interior wall, and disposed adjacent the combustion gate in the operating direction. Each gate is slidable longitudinally within the combustion chamber throughway. Rotation of the rotor piston, to a position where a lobe end of the piston aligns with a combustion gate, forms a combustion chamber.

20 Claims, 27 Drawing Sheets

US 9,435,257 B2

HCCI ROTARY ENGINE WITH VARIABLE COMPRESSION RATIO CONTROL

CROSS-REFERENCE TO RELATED APPLICATION(S)

This application is the national phase of PCT Application No. PCT/CA2015/050229 filed Mar. 25, 2015, which in turns claims the benefit of U.S. Provisional Application No. 61/973,989 filed Apr. 2, 2014 and of U.S. Provisional Application No. 62/034,155 filed Aug. 7, 2014.

FIELD

The present invention relates to Homogenous Charge Compression Ignition (HCCI) engines, and in particular, to a means for dynamic control of the compression ratio of a rotary HCCI engine.

BACKGROUND

Most car engines are pre-mixed spark-ignition gasoline-type engines, or compression-ignition diesel-type engines. HCCI combines both techniques; it utilizes a pre-mixed air-fuel charge, as with spark-ignition engines, but ignites the mixture using compression, rather than a spark ignition mechanism such as a spark plug, to raise the temperature of the air-fuel mixture to the point of combustion. HCCI involves the compression of a pre-mixed air-fuel mixture, resulting in uniform combustion throughout the mixture.

By replacing traditional heterogeneous hot combustion by propagation of a flame-front, with overall, flameless, homogenous combustion (in which the entire, homogenously mixed air-fuel mixture combusts simultaneously), combustion can be achieved at lower temperatures (typically less than 1,300° C.). HCCI engines therefore typically produce lower levels of NOx and particulate matter (soot), while offering greater economic operating efficiency.

Despite the advantages of HCCI, HCCI engines are not widely commercially available. The auto-ignition of the homogenous air-fuel mixture has proven difficult to control and keep stable. Typically, control is attempted using a microprocessor or Engine Control Unit (ECU) which monitors certain operating conditions in order to accurately control the combustion chamber temperature and mixture on each iteration of the combustion cycle (such as the four-stroke Otto cycle). However, the parameters are many (e.g., RPMs, cylinder pressure, ambient air temperature, engine temperature, engine load, atmospheric pressure) and the ECU must be capable of dynamic and precise control of the actuation system (e.g. air intake/exhaust valves), within very short periods of time, in order to achieve HCCI. A typical approach to controlling HCCI combustion is to vary the compression ratio of the combustion chamber in accordance with such factors.

Further, because HCCI requires high compression ratios, stronger engine construction is often required for HCCI engines. This is especially a concern in HCCI where improperly controlled combustion can lead to detonation rather than combustion. If the engine construction is not robust, this can lead to destruction of the engine, as is sometimes seen with detonation events in reciprocating aluminum piston engines. Rotary engines, by virtue of their geometry, are inherently stronger and are therefore less prone to destruction in the event of detonation.

Because of the high pressure conditions, the many factors required to be monitored, and the limited time in which to process and induce the physical adjustments necessary to the actuation system in response to the factors, it is difficult to realize HCCI in typical reciprocating or Wankel™ type-engines. These engines have complex actuation systems, involving, for example, valves for in-take and exhaust, which adds to the number of elements required to be controlled and adjusted in order to achieve HCCI.

In some cases, involving reciprocating or Wankel™ engines, small diameter piston heads ("controlling pistons") disposed within the combustion chamber have been used. However, because of the relatively small ratio of the surface area of the controlling piston to the relatively large combustion chamber volume, the controlling piston is of little effect and is required to be moved a great extent in order to achieve minimal changes in chamber volume (and therefore in compression ratio). Furthermore, in such cases, the range of compression ratios that can be realized is narrowed as the controlling piston is incapable of reducing the chamber volume to zero. If the controlling piston is increased in size, little space is left in the cylinder head for other required components, such as valves, spark plugs and fuel injectors, and therefore, such solutions result either in an implementation with small valves, or an implementation with small controlling pistons and combustion chambers having a small range of compression ratio variance. In either case, the result is an engine in which it would be difficult to control and maintain HCCI under varying operating conditions.

SUMMARY

There is provided an apparatus for regulating a compression ratio of a Homogenous Charge Compression Ignition (HCCI) rotary engine by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having interior throughway walls that include at least first and second walls, the apparatus comprising, within each of the one or more combustion chamber throughways, an expansion gate slidably received within the respective throughway and slidably engaged with and adjacent to said first interior throughway wall, a combustion gate slidably engaged with and adjacent to the expansion gate, the combustion gate disposed adjacent the expansion gate in the operating direction and having a piston-facing surface oriented toward the piston chamber, and a compression gate slidably engaged with and adjacent to both the combustion gate and said second interior throughway wall, the compression gate disposed adjacent the combustion gate in the operating direction, each of said expansion, combustion and compression gates slidable longitudinally within the respective combustion chamber throughway, wherein rotation of the rotor piston, to a position where a lobe end aligns with the piston-facing surface of a respective one of said one or more combustion gates, forms a combustion chamber defined at least by a portion of interior walls of said respective expansion and compression gates, the piston-facing surface of said respective combustion gate, a portion of the throughway walls of said respective combustion chamber throughway, and said lobe end.

There is also provided an apparatus for regulating a compression ratio of a Homogenous Charge Compression Ignition (HCCI) rotary engine by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having interior throughway walls that include at least first and second walls, the apparatus comprising, within each of the one or more combustion chamber throughways, an expansion gate slidably received within the respective throughway and slidably engaged with and adjacent to said first interior throughway wall, said expansion gate having a piston-facing surface oriented toward the piston chamber, a combustion gate slidably engaged with and adjacent to the expansion gate, the combustion gate disposed adjacent the expansion gate in the operating direction and having a piston-facing surface oriented toward the piston chamber, and a compression gate slidably engaged with and adjacent to both the combustion gate and said second interior throughway wall, the compression gate disposed adjacent the combustion gate in the operating direction and having a piston-facing surface oriented toward the piston chamber, each of said expansion, combustion and compression gates slidable longitudinally within the respective combustion chamber throughway, and each of said expansion and compression gates including a distally arranged roller bearing adjacent its piston-facing surface, wherein said stator and said respective expansion, combustion and compression gates include passages for the supply of lubricating fluid, and wherein rotation of the rotor piston, to a position where a lobe end aligns with the piston-facing surface of a respective one of said one or more combustion gates, forms a combustion chamber defined at least by a portion of interior walls of said respective expansion and compression gates, the piston-facing surface of said respective combustion gate, a portion of the throughway walls of said respective combustion chamber throughway, and said lobe end.

Further there is provided an apparatus for regulating a compression ratio of a Homogenous Charge Compression Ignition (HCCI) rotary engine by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having interior throughway walls that include at least first and second walls, the apparatus comprising, within each of the one or more combustion chamber throughways, an expansion gate slidably received within the respective throughway and slidably engaged with and adjacent to said first interior throughway wall, a combustion gate slidably engaged with and adjacent to the expansion gate, the combustion gate disposed adjacent the expansion gate in the operating direction and having a piston-facing surface oriented toward the piston chamber, a compression gate slidably engaged with and adjacent to both the combustion gate and said second interior throughway wall, the compression gate disposed adjacent the combustion gate in the operating direction, and an energy transfer mechanism to transfer kinetic energy from said compression gate to said expansion gate, each of said expansion, combustion and compression gates slidable longitudinally within said respective combustion chamber throughway, wherein each said expansion gate and compression gate of each of said one or more combustion chamber throughways moves synchronously with the rotation of the rotor piston, and wherein rotation of the rotor piston, to a position where a lobe end aligns with the piston-facing surface of a respective one of said one or more combustion gates, forms a combustion chamber defined at least by a portion of interior walls of said respective expansion and compression gates, the piston-facing surface of said respective combustion gate, a portion of the throughway walls of said respective combustion chamber throughway, and said lobe end.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

Figure 1:
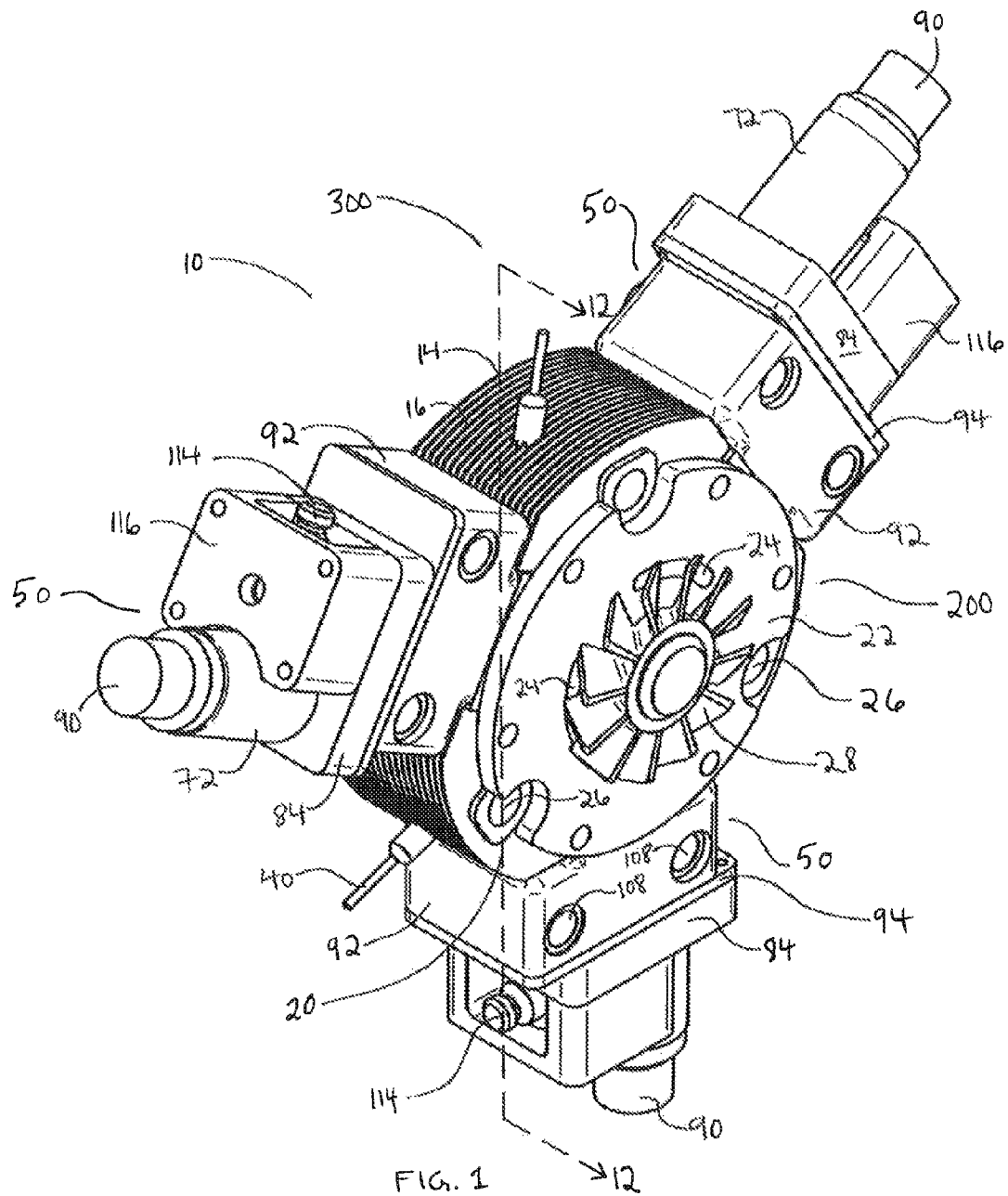
FIG. 1 is a front perspective view of a double lobe rotor piston HCCI rotary engine with an apparatus for regulating HCCI compression ratio constructed in accordance with the present invention.

The present invention may be embodied in a number of different forms. The specification and drawings that follow describe and disclose some of the specific forms of the invention.

Referring to FIGS. 1 to 12, an apparatus for regulating the compression ratio of a HCCI rotary engine 200 by varying combustion chamber volume, constructed in accordance with an embodiment of the invention, is noted generally by reference numeral 10. Rotary engine 200 comprises rotor piston 12 concentrically arranged within cylindrical stator 14. The stator has an exterior stator surface 16 and an interior stator surface 18, the latter shown, for example, in FIG. 3. Intake/exhaust side 20 of the stator comprises one or more exhaust ports 26. The intake/exhaust side typically has attached thereto intake flange 22. The intake flange can have formed therein one or more intake ports 24, and an axially rotatable intake fan 28 can be attached to the intake flange for the intake of air to the engine during operation. On rear side 30 of the engine, shown in FIG. 2, there is attached opposite side flange 32. The flanges are typically attached by nuts and bolts, although other suitable means for attachment can be used which permits removal of one or more of flanges 22 and 32 when necessary to access the interior of the stator. The rotor piston is disposed between the flanges.

Interior stator surface 18 defines piston chamber 34, shown, for example, in FIGS. 3-11. The piston chamber is enclosed on either side by flanges 22 and 32. As can be seen in FIGS. 4-11, intake ports 24 extend into the piston chamber so that there is a passage for air external to the engine to flow from the exterior of the engine to the piston chamber. The exterior and interior stator surfaces are separated by stator body 36, typically a solid metal alloy which may have one or more passages formed therethrough for various purposes. For example, with reference to FIGS. 1 and 4, the stator body can have formed therein one or more fuel injector passages 38 for fuel injectors 40, allowing the fuel injectors to inject fuel, as required, into the piston chamber in order to charge air for eventual combustion. The stator body can also have formed therein exhaust port passages 42, also shown in section in FIG. 12, facilitating the exhaust of combustion products from the piston chamber to the exterior of the engine.

Figure 2:
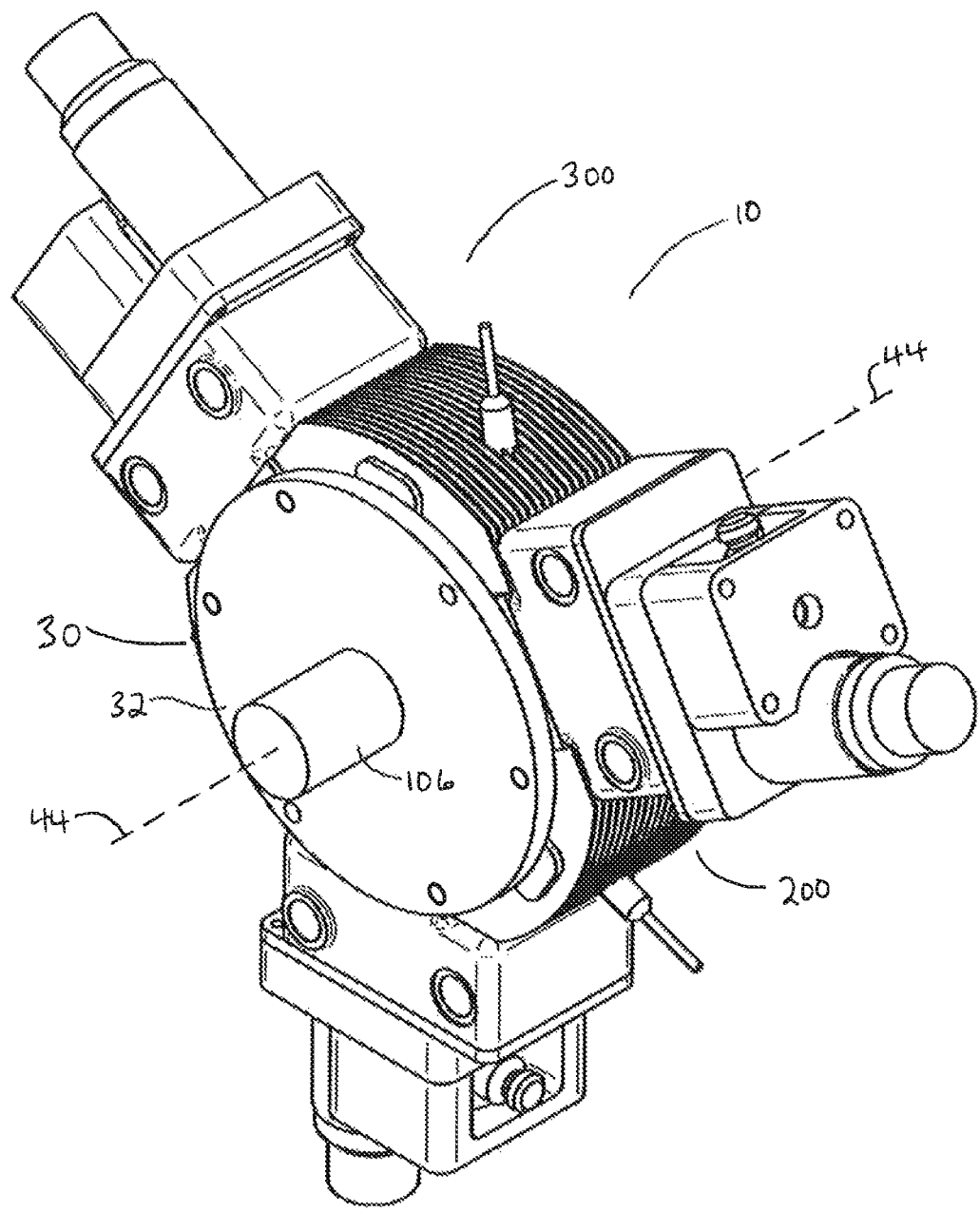
FIG. 2 is a rear perspective view of the rotary engine of FIG. 1.

The rotor piston is rotatable within the piston chamber about stator axis 44, shown in FIG. 2. Under normal operating conditions, the rotor piston rotates in an operating direction, shown, for example, as a clockwise direction in FIGS. 4 to 11, as denoted by the arrows. The rotor piston comprises one or more lobes 46. Where the rotor comprises a single lobe, as shown in FIGS. 13 to 17, 21, 22, and 24 to 27, external counterweights (not shown) can be used to balance the engine during use. Where there are two or more equally-spaced lobes, the rotor piston is dynamically balanced within the stator. In the embodiments shown in the drawings, the rotor piston has two opposing lobes 46, each lobe having a distal lobe end 48. Distal lobe end 48 is the surface of the rotor piston that moves in slidable contact with interior stator surface 18 as the rotor piston rotates about the stator axis within the piston chamber.

Figure 12:
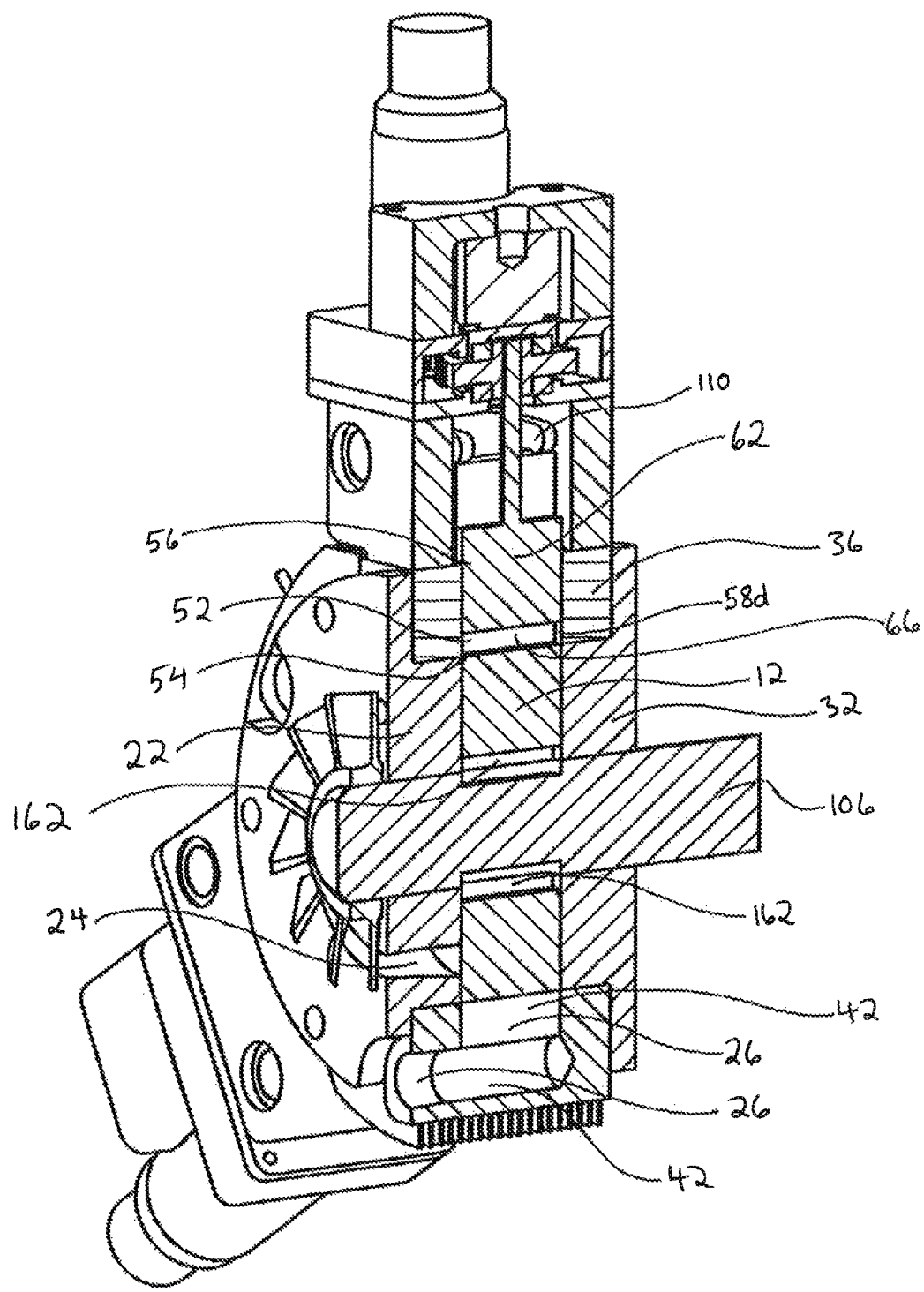
FIG. 12 is a sectional view of the rotary engine of FIG. 1 taken along line 12-12.

Stator body 36 has defined therein one or more combustion chamber assemblies 50, each combustion chamber assembly comprising combustion chamber throughway 52. Referring to FIG. 12, each combustion chamber throughway extends from an interior combustion chamber opening 54, defined on the interior stator surface, through the stator body, to an exterior combustion chamber opening 56 defined on the exterior stator surface opposite the interior combustion chamber opening. Where there is more than one combustion chamber assembly, the combustion chamber throughways are substantially equally spaced about the stator body to enhance engine smoothness. Each combustion chamber throughway includes interior throughway walls 58 that define the respective throughway. Interior throughway walls 58 include at least a first interior throughway wall 58a and a second interior throughway wall 58b opposite the first throughway wall (see, e.g., FIG. 25). The first and second throughway walls 58a and 58b are those stator walls that are adjacent expansion gate 60 and compression gate 64, respectively. A fuel injector, air intake port, and exhaust port is typically associated with each of the combustion chamber throughways.

In an embodiment, apparatus 10 comprises, within each combustion chamber throughway, expansion gate 60, combustion gate 62 that is slidably engaged with and adjacent to the expansion gate in the operating direction, and compression gate 64 that is slidably engaged with and adjacent to the combustion gate in the operating direction. Each of the expansion, combustion and compression gates is slidable longitudinally within the respective combustion chamber throughway. Further, the expansion and compression gates are slidable so that at least a portion thereof can protrude into piston chamber 34. Each of the expansion and compression gates is also capable of being fully retracted into the respective combustion chamber throughway so that no portion thereof protrudes into piston chamber 34. When fully retracted, piston-facing surface 70 of the respective expansion gate 60 or compression gate 64 may be positioned for slidable engagement with rotor piston lobe end 48. In embodiments using roller bearings 208, described below, contact may instead occur between roller bearings 208 of the expansion and compression gates and rotor piston 12 when the respective gate is fully retracted into combustion chamber throughway 52.

Figure 3:
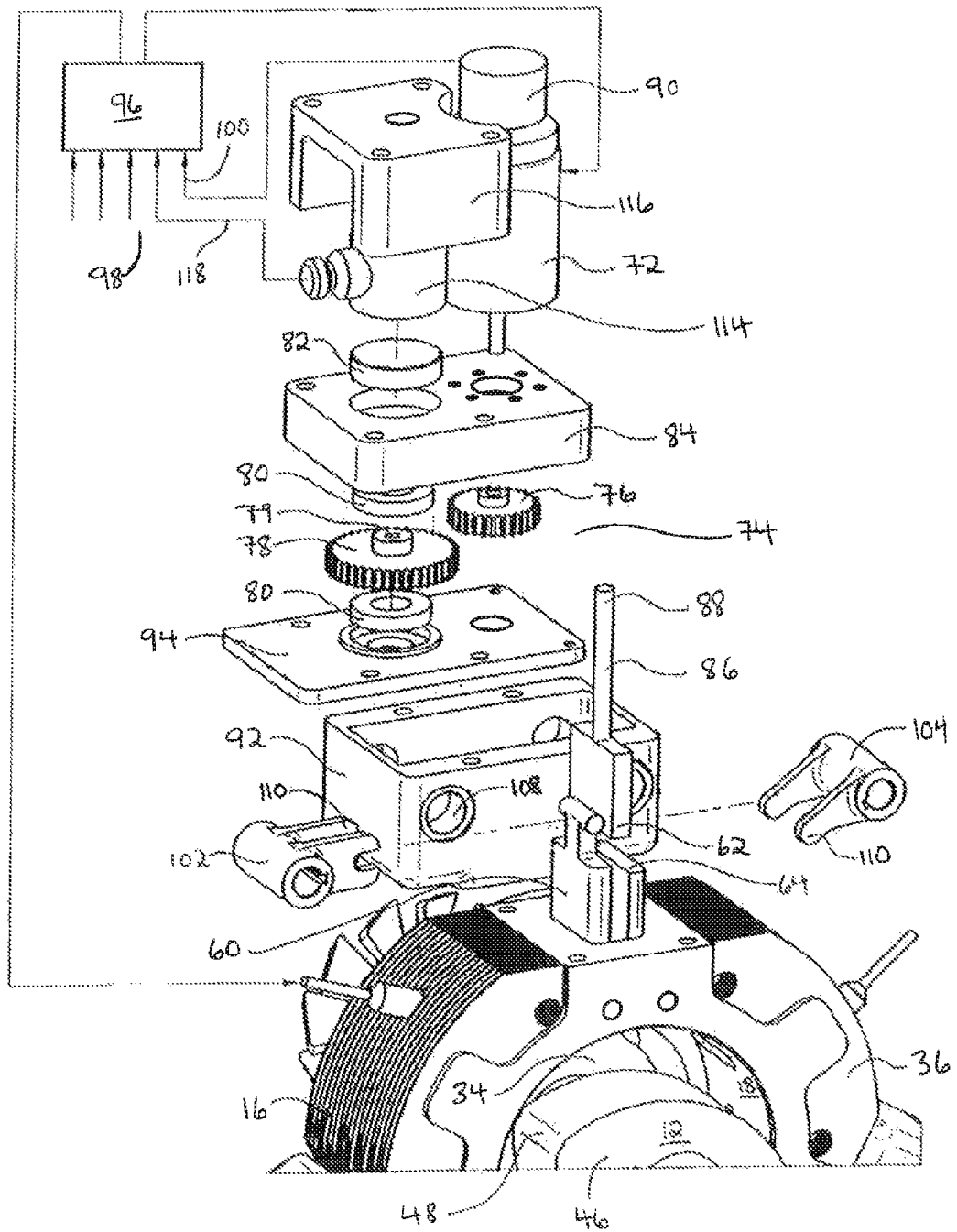
FIG. 3 is a partial exploded view of the rotary engine of FIG. 1.
Figure 4:
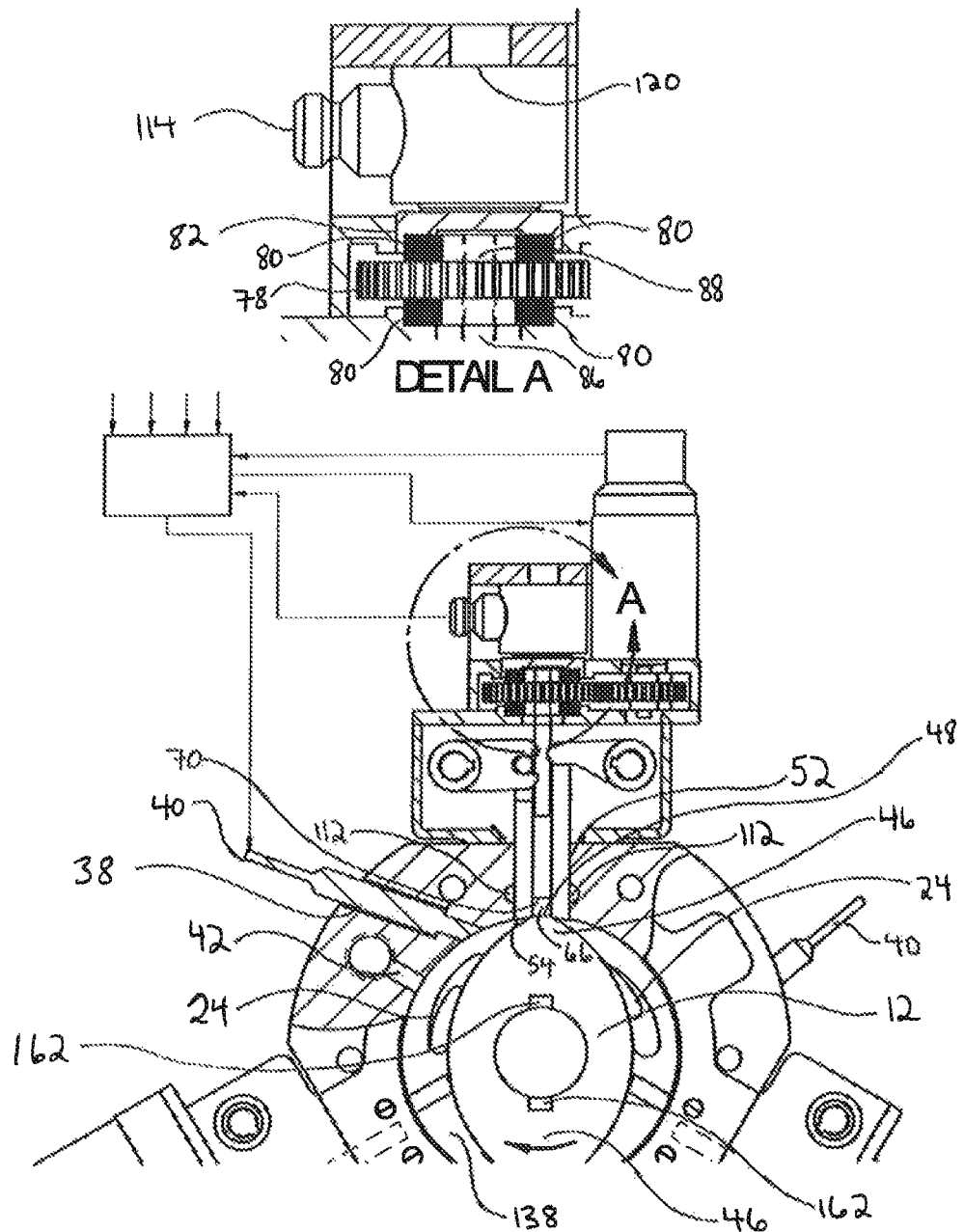
FIG. 4 is a partial cross-sectional view of the rotary engine of FIG. 1 showing a magnified view of a load cell.
Figure 10:
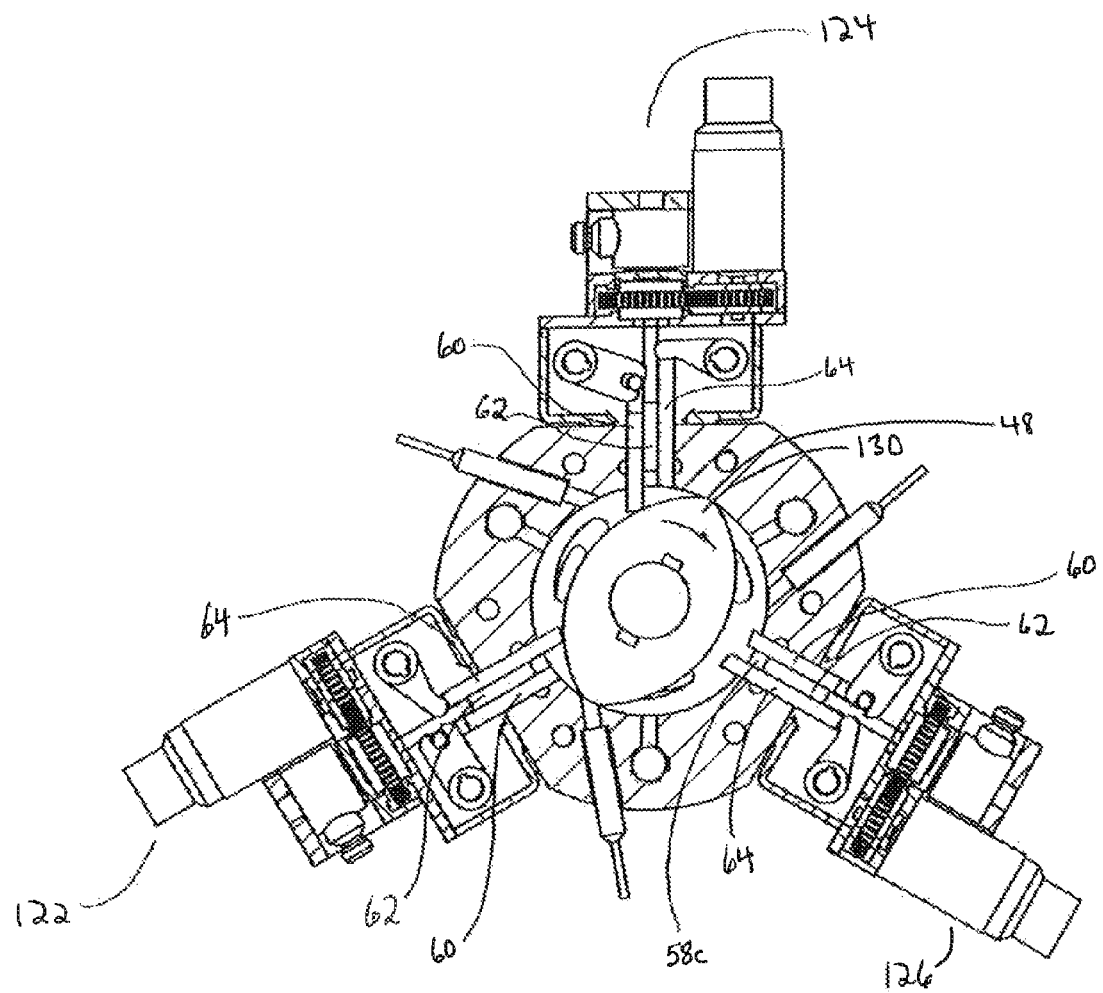
Figure 11:
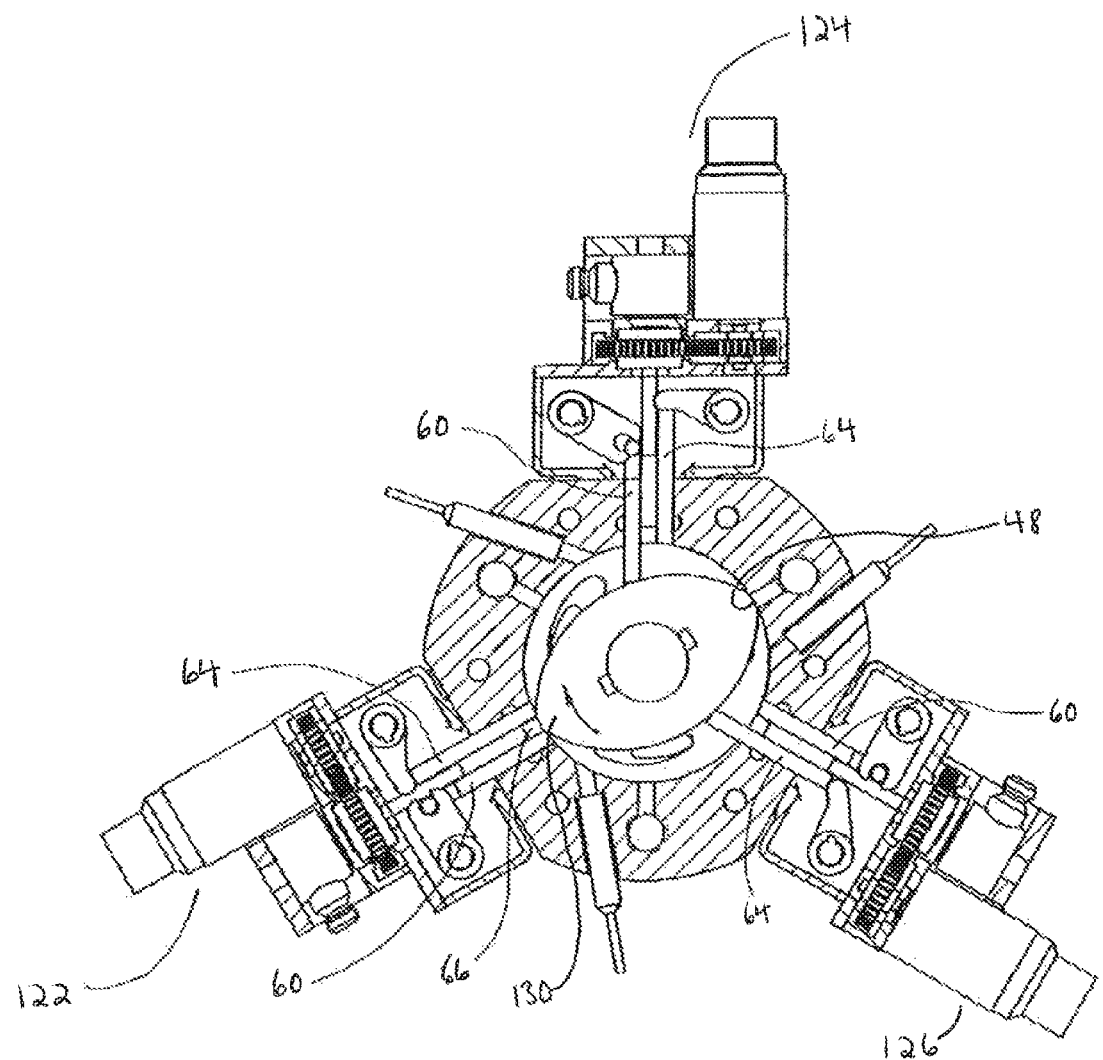

Referring to FIG. 4, each gate has a piston-facing surface 70. During operation of the engine, when rotor piston 12 is rotated to a position at which one of the rotor piston lobe ends 48 is aligned with the piston-facing surface of combustion gate 62, combustion chamber 66 is formed. The combustion chamber is defined at least by (i) a portion of interior walls 68 of the expansion and compression gates (see FIG. 8), (ii) piston-facing surface 70 of combustion gate 62, (iii) a portion of throughway walls 58 disposed opposite each other in a direction transverse to the operating direction (see, e.g., FIGS. 10 and 12 showing third and fourth throughway walls 58c and 58d, respectively), and (iv) the lobe end 48 facing the combustion gate piston-facing surface. Similar to throughway walls 58a and 58b, throughway walls 58c and 58d may be walls formed within stator body 36 (as can be discerned, e.g., from FIG. 3). Alternately, the combustion chamber throughway may extend through stator body 36 from intake/exhaust side 20 to rear side 30 of engine 200. In that case, third and fourth throughway walls 58c and 58d may include interior flange surfaces 138 (shown, e.g., in FIGS. 4 and 5) of intake flange 22 and opposite side flange 32, respectively. Where one or more of the flanges are not used, an alternate structure or structures integral with or secured to the engine and suitable for forming walls of combustion chamber 66 may be utilized. Where the combustion chamber throughway extends from intake/exhaust side 20 to rear side 30 of the engine, expansion gate 60, combustion gate 62, and compression gate 64 would similarly span the width of the stator body. Generally, the expansion, combustion and compression gates will be sized and dimensioned for slidable engagement with the applicable adjacent gate(s) and interior throughway walls 58, when within the combustion chamber throughway. In embodiments using roller bearings 208, discussed below, the roller bearings may also form part of combustion chamber 66. In this way, the apparatus provides a relatively small and unobstructed combustion chamber in which the ratio of the surface area of the combustion gate piston-facing surface to the combustion chamber volume is relatively high. Longitudinal movement of combustion gate 62 is expected to vary the compression ratio of the respective combustion chamber 66. Further, it is expected that the relatively high ratio between the surface area of the combustion gate piston-facing surface 70 and the combustion chamber volume will facilitate significant changes in the compression ratio with only minimal longitudinal movements of combustion gate 62.

Each lobe end 48 is at least as wide as the combustion gate piston-facing surface 70 to allow the lobe end to seal the combustion chamber from the piston chamber upon alignment of the lobe end with the combustion gate. In some embodiments, there can be a certain amount of overlap between the lobe ends and the piston-facing surfaces of the compression and expansion gates when the lobe end is aligned with the combustion gate 62. That overlap may improve sealing characteristics of the apparatus.

In some cases, the longitudinal movement of a combustion gate 62 within a respective combustion chamber throughway 52 is facilitated by a servo motor 72 associated with each combustion chamber assembly 50. As shown in FIG. 3, each servo motor 72 may be mechanically linked to a respective combustion gate by a combustion gate drive assembly 74 comprising drive gear 76, internally threaded driven gear 78, and driven gear angular contact bearings 80 for bearing thrust and radial load. The angular contact bearings are typically required to be preloaded. In most cases, the combustion gate drive assembly is contained within combustion gate drive housing 84. Regulating shaft 86 is expected to have a portion that is threaded along, at least, top portion 88 of the shaft. The threaded portion of shaft 86 is threaded into internally threaded portion 79 of driven gear 78 so that axial rotation of driven gear 78 causes longitudinal movement of combustion gate 62 toward piston chamber 34, or away from it, depending on the direction of gear rotation. In some cases, regulating shaft 86 may be linked to a hydraulic piston equipped with a linear variable-differential transformer (LVDT), for position feedback, and a pressure gage for pressure control. The hydraulic piston may be controlled by electromechanical valves that may be controlled by processor 96. Other types of servo mechanisms may also be utilized.

In most embodiments, the servo motors (or the electromechanical valves) are operated by processor 96 (engine control unit or "ECU") that is capable of reading a plurality of inputs 98 corresponding to a plurality of operating conditions. The processor is capable of executing instructions stored on a computer-readable medium, such as a non-volatile flash memory associated with the processor, or other such or similar forms of non-volatile memory. When the instructions are executed by the processor, the instructions cause the processor to cause the servo motor to position combustion gate 62 in a desired position depending on any one or more of a plurality of operating conditions.

In most cases, each servo motor 72 is associated with a resolver 90 (or other analogue or digital mechanism for measuring degrees of rotation of one or more of the gears of the combustion gate drive assembly). Resolver 90 provides positional feedback 100 to processor 96 regarding the position of combustion gate 62. The position of the combustion gate may be one of the operating conditions in the plurality of operating conditions.

The plurality of operating conditions may include a combination of one or more of rotor piston angular speed (i.e. revolutions per minute (RPMs)), ambient air temperature, ambient humidity, engine temperature, engine load, atmospheric pressure, rotor piston position, exhaust gas feedback, and combustion gate position 100. The exhaust gas feedback may be received, for example, from an exhaust gas oxygen sensor (such as a lambda sensor) providing information on the levels of oxygen in the exhaust gas. Other sensors capable of reading other exhaust gas composition details may also be utilized.

Expansion gate 60, combustion gate 62, and compression gate 64, or at least parts thereof, may be housed within a gate housing 92 having a housing cover 94. The expansion and compression gates move synchronously with the rotation of the rotor piston. Typically, synchronicity is achieved by gate controlling elements, two examples 102, 104 of which are shown in FIGS. 3 to 11 (and another two examples 202, 204 of which are shown in FIGS. 13 to 17, 21 to 24, and 26). The gate controlling elements, in most cases, are attached to cam-like elements 206 (shown in FIGS. 13 to 17 and 24), which are associated with, or operatively linked to, transmission shaft 106. The transmission shaft is axially arranged along the stator axis and operatively associated with, or attached to, rotor piston 12 at accommodation 164 centrally arranged in the rotor piston, so that rotation of the rotor piston about the stator axis causes axial rotation of the transmission shaft. In this way, rotation of the rotor piston causes corresponding movement of the cam-like elements (and therefore of the gate controlling elements and the expansion and compression gates attached thereto). Typically, transmission shaft 106 has one or more shaft keyways 162 to facilitate torque transmission from the rotor piston to the shaft. Openings 108 can be formed in the gate housing to accommodate the controlling elements and to allow pivotal movement of the controlling elements so that a distal end 110 of the respective controlling element, which is attached to the respective gate, can move the respective expansion or compression gate longitudinally within the combustion chamber throughway.

To facilitate movement of expansion gate 60, combustion gate 62, and compression gate 64, and further to facilitate sealing and/or cooling, in some embodiments the expansion, combustion and compression gates are lubricated by fluid (typically oil) that is supplied through fluid passages 112 (see FIGS. 4 to 11). Typically, fluid is supplied to the fluid passages from a source external to the stator (not shown). In most cases, each of the expansion and compression gates is disposed adjacent to one of the passages 112, and passages 112 are disposed external to combustion chamber throughway 52 and defined in stator body 36. One particular embodiment of passages 112, described in detail below, is shown in FIGS. 24 to 27 as passages 112a to 112h. Other configurations and embodiments of passages 112 are possible.

Apparatus 10 may further comprise load cell or pressure-measuring device 114 associated with each of the combustion gates. Typically, each load cell includes a pressure sensor disposed external to the combustion chamber, and may be housed within load cell housing 116. Load cell 114 may be a high frequency response dynamic load cell. Each load cell is capable of measuring the pressure within the respective combustion chamber exerted against the respective combustion gate 62, and is capable of transmitting the combustion chamber pressure data 118 to the ECU. The plurality of operating conditions may include combustion chamber pressure data 118. In embodiments using load cell 114, apparatus 10 can further comprise angular bearing sliding seat 82 for placement over angular bearings 80. Load cell 114 may be disposed adjacent shimmable mounting surface 120 so that angular bearings 80 can be subjected to an appropriate bearing preload, although other means for preloading the angular bearings can also be used.

Referring to FIGS. 5-11, an embodiment of apparatus 10 is shown in a rotary engine having three combustion chamber assemblies 50: a first combustion chamber assembly 122, a second combustion chamber assembly 124, and a third combustion chamber assembly 126. Second combustion chamber assembly 124 is disposed in the operating direction (shown in the figures as clockwise, as an example) from first combustion chamber assembly 122, and third combustion chamber assembly 126 is disposed in the operating direction from second combustion chamber assembly 124. Each combustion chamber assembly comprises combustion chamber throughway 52. FIGS. 5-11 depict the rotor piston at various stages of a single 360° revolution in the operating direction, the operating direction denoted by the direction of the arrows in the figures. Each such revolution in the operating direction is referred to hereinafter as an "engine cycle". Generally, the number of combustion events per engine cycle can be calculated as the product of the number of rotor lobes multiplied by the number of combustion chamber assemblies, with each combustion event occurring in a crank rotation that is 360° divided by the number of combustion events. In the example shown in FIGS. 5 to 11, the amount of rotation of the crank for each combustion event is 60°. In most embodiments, during operation, the expansion and compression gates move synchronously with the rotation of the rotor piston, during each engine cycle, in the manner hereinafter described.

Figure 5:
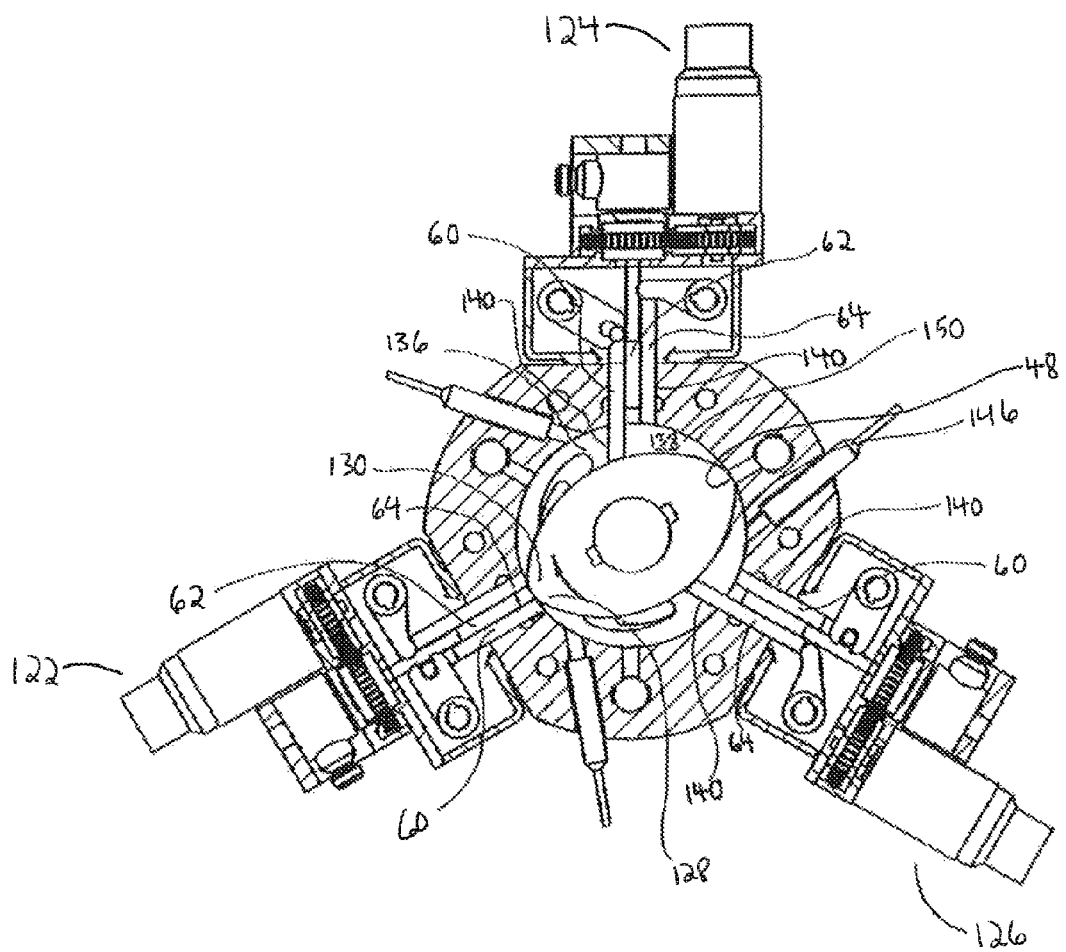
FIGS. 5-11 show partial cross-sectional views of the rotary engine of FIG. 1 and show a rotor piston of the rotary engine at various stages during an engine cycle.

Referring to FIG. 5, rotor piston 12 is disposed at combusting position 128 for first combustion chamber assembly 122. At this position, a lobe end of the rotor piston is aligned with the piston-facing surface of combustion gate 62 for first combustion chamber assembly 122. For ease of reference, the lobe having this lobe end is referred to as reference lobe 130 when described in the context of FIGS. 5-11. Movement of reference lobe 130 to the combusting position for the first combustion chamber assembly represents the beginning of the combustion phase for the first combustion chamber assembly, during which the pressure and temperature realized within the combustion chamber upon alignment of the reference lobe therewith results in HCCI.

When reference lobe 130 is disposed at the combusting position for the first combustion chamber assembly, piston-facing surface 70 (or roller bearing 208 thereof, described below) of expansion gate 60 associated with second combustion chamber assembly 124 is in contact with the rotor piston. The combustion phase of the first combustion chamber assembly ends with combustion within the combustion chamber of the first combustion chamber assembly. The scavenging phase for the second combustion chamber assembly continues in scavenging chamber 136. Scavenging chamber 136 is a portion of the piston chamber, clockwise of the reference lobe (i.e., disposed adjacent the reference lobe in the operating direction), and defined at least by the rotor piston, interior stator surface 18, interior flange surfaces 138, and an exterior wall 140 of the expansion gate of the second combustion chamber assembly. At the same time, piston-facing surface 70 (or roller bearing 208 thereof, described below) of the compression gate associated with third combustion chamber assembly 126 is in contact with the rotor piston. The expansion phase ends for the second combustion chamber assembly and the compression phase begins for the third combustion chamber assembly. The scavenging phase continues for the first combustion chamber assembly. During any scavenging phase, combustion products are exhausted from the piston chamber via the exhaust ports and fresh air is brought into the piston chamber via the intake ports. Each scavenging phase for a combustion chamber assembly begins at the end of the expansion phase of the previous chamber assembly, and ends at the beginning of the compression phase for that combustion chamber assembly.

Figure 6:
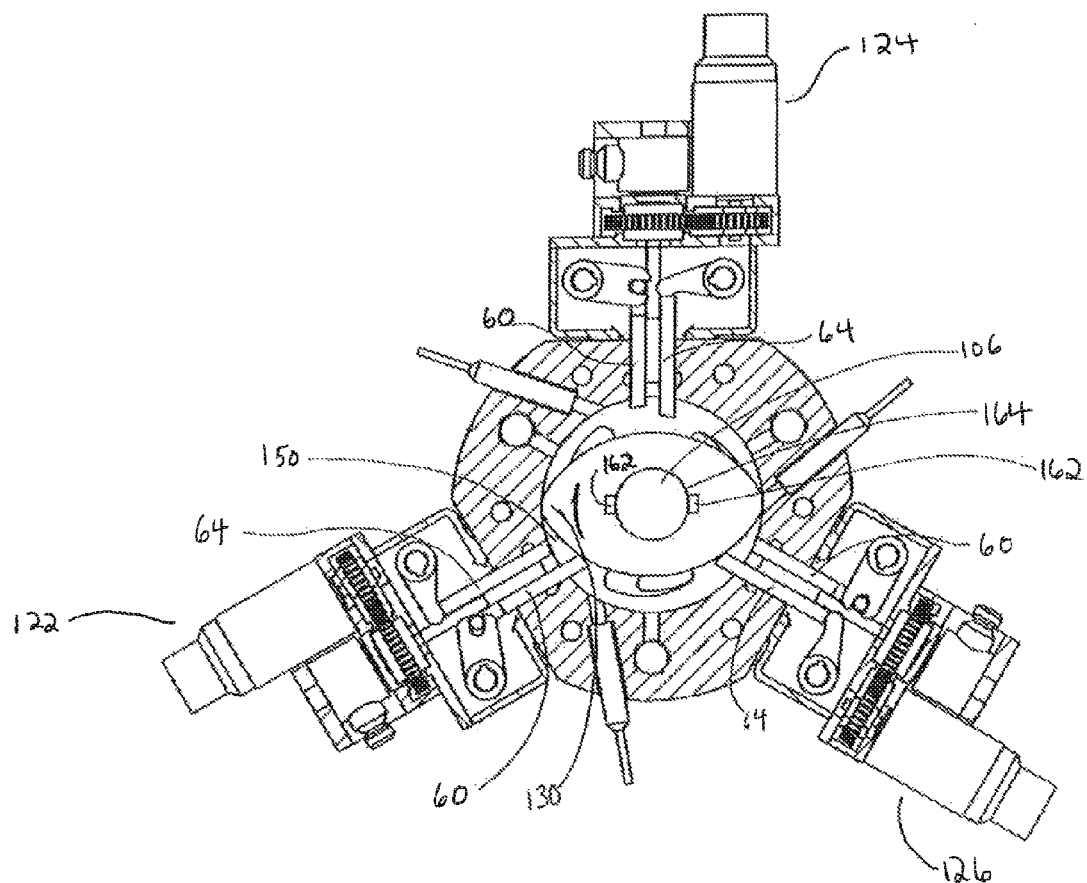

Referring to FIG. 6, the force of the combustion in the first combustion chamber assembly combustion chamber causes propulsion of the rotor piston toward the operating direction from its previous position at first combustion chamber assembly 122. Immediately after combustion for the first combustion chamber assembly, the expansion phase for the first combustion chamber assembly begins. The expansion gate of the first combustion chamber assembly extends into the piston chamber so that the expansion gate piston-facing surface (or roller bearing 208 thereof, described below) contacts the rotor to define expansion chamber 150. The expansion chamber for the first combustion chamber assembly is a portion of the piston chamber that is counter-clockwise of reference lobe 130 (i.e., disposed adjacent the reference lobe in the direction opposite to the operating direction). The expansion chamber is thus defined at least by the rotor piston, the interior stator surface, the interior flange surfaces, piston-facing surfaces 70 of the compression and combustion gates of the first combustion chamber assembly, and interior walls 68 of the compression and expansion gates of the first combustion chamber assembly.

Figure 7:
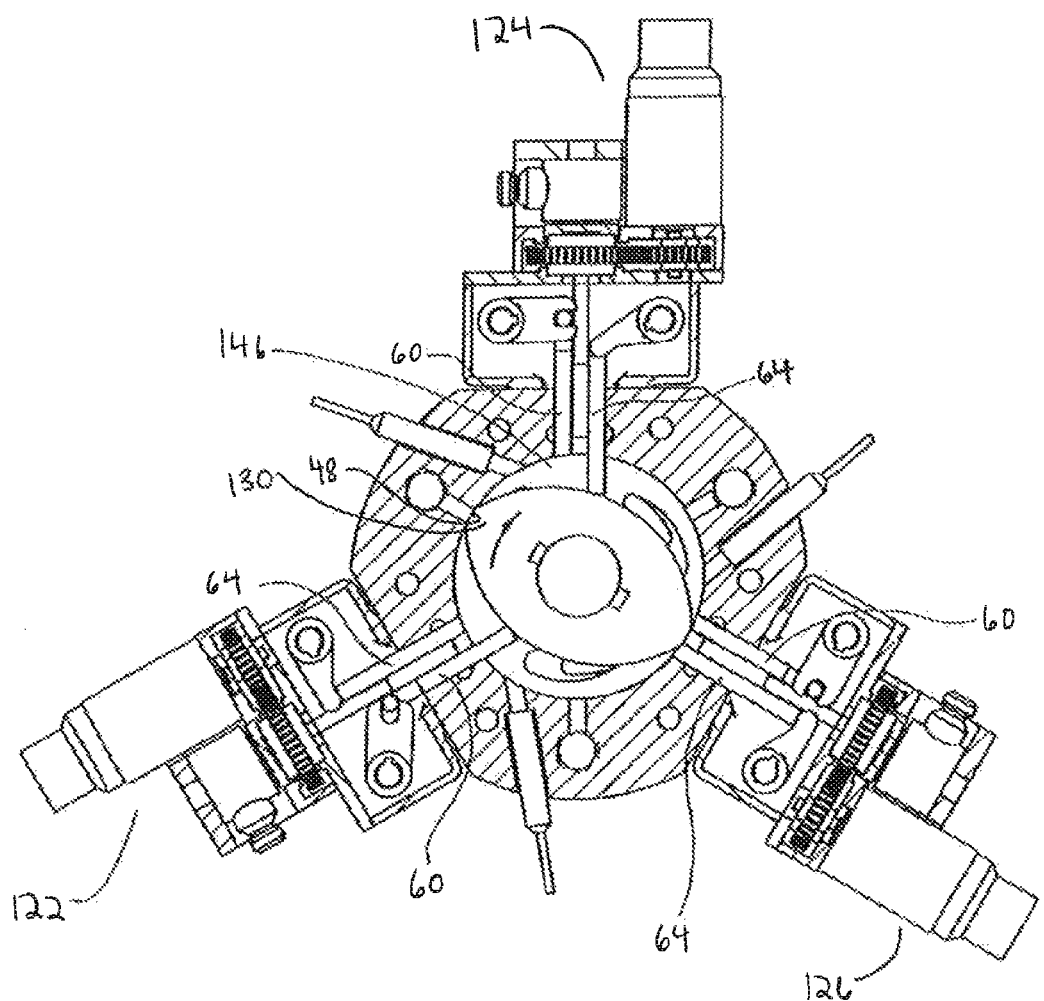
Figure 8:
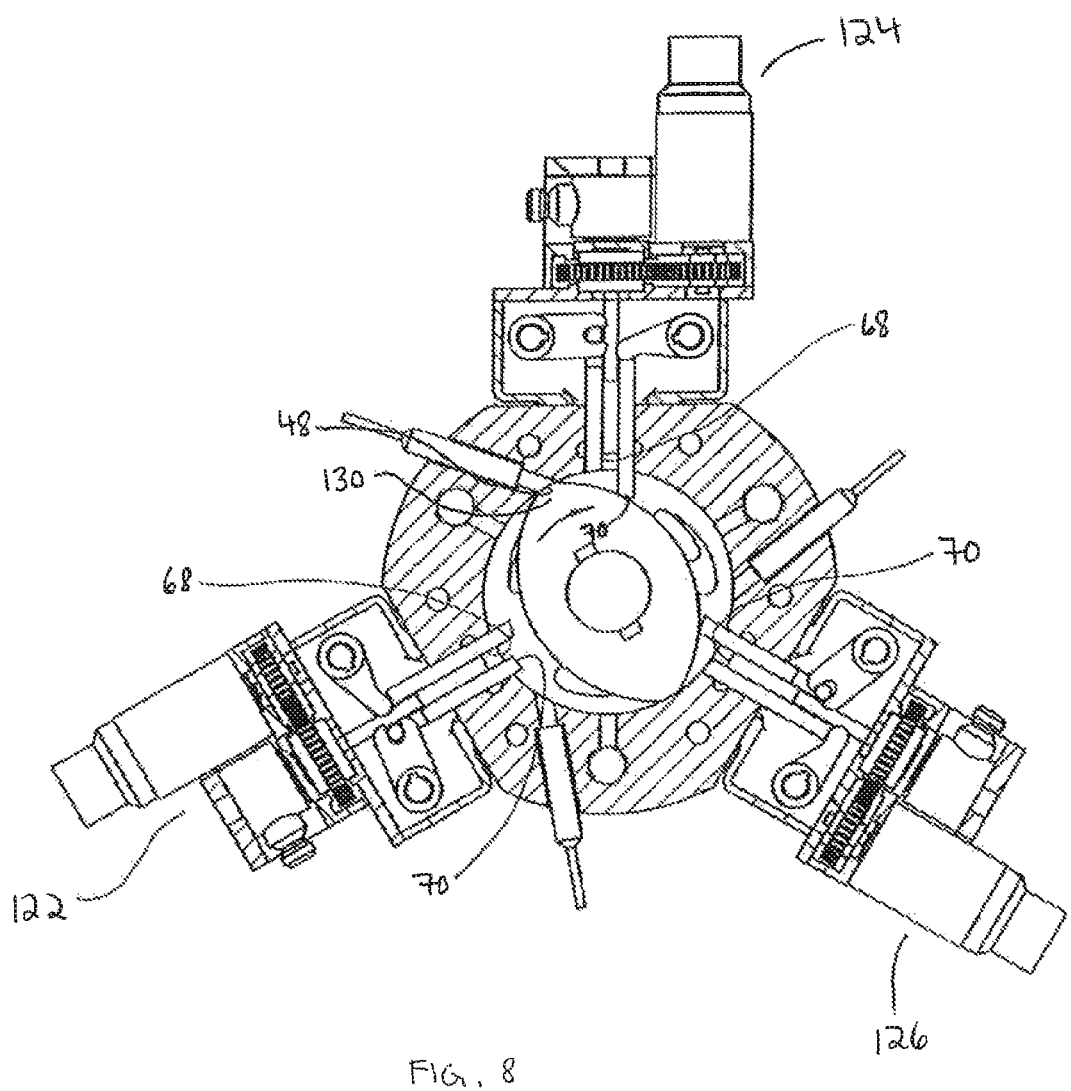
Figure 9:
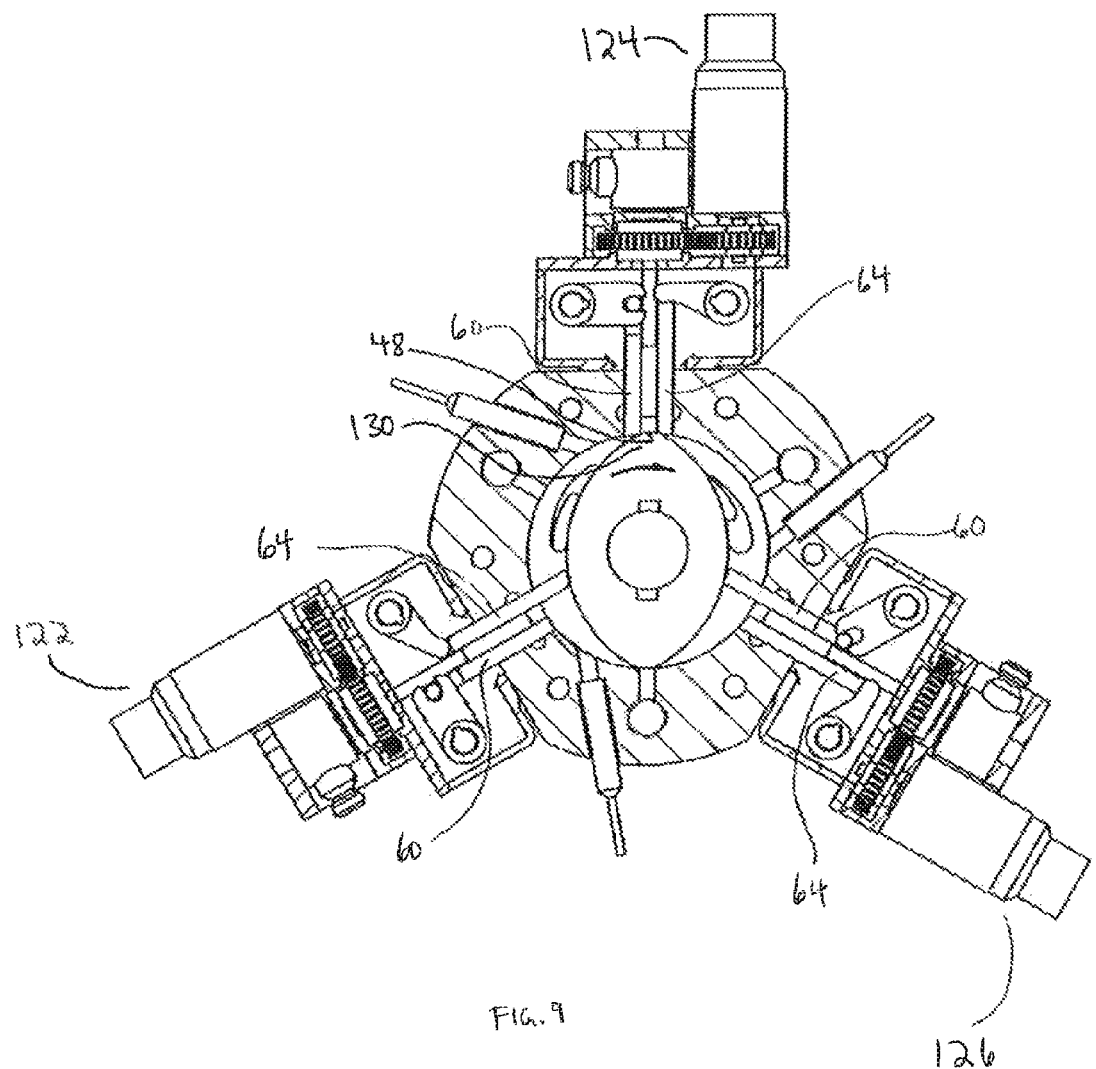

Referring to FIGS. 6 and 7, during the clockwise movement of the reference lobe from first combustion chamber assembly 122 to second combustion chamber assembly 124, expansion gate 60 of the second combustion chamber assembly retracts fully into the respective combustion chamber throughway (as shown in FIG. 7). Simultaneously, compression gate 64 of second combustion chamber assembly 124 extends into the piston chamber, from the respective combustion chamber throughway, until its piston-facing surface (or roller bearing 208 thereof, described below) contacts the rotor piston (as shown in FIG. 7). That contact results in the start of the compression phase for second combustion chamber assembly 124. The contact of the piston-facing surface (or roller bearing 208 thereof) of the second combustion chamber assembly compression gate and the rotor piston defines compression chamber 146 for the second combustion chamber assembly, shown in FIG. 7. The second combustion chamber assembly compression chamber is that portion of the piston chamber clockwise of the reference lobe in FIG. 7 (i.e., disposed adjacent the reference lobe in the operating direction), defined at least by the rotor piston, the interior stator surface, the interior flange surfaces, the piston-facing surfaces of the expansion and combustion gates of the second combustion chamber assembly, and the interior walls of the compression and expansion gates of the second combustion chamber assembly. The beginning of the compression phase for the second combustion chamber assembly coincides with the beginning of the combustion phase for the third combustion chamber assembly and the end of the expansion phase for the first combustion chamber assembly. The piston-facing surface (or roller bearing 208 thereof) of the expansion gate of the first combustion chamber assembly is in contact with the rotor piston when the piston-facing surface (or roller bearing 208 thereof) of the second combustion chamber assembly compression gate is in contact with the rotor piston.

The compression phase for any combustion chamber assembly ends with the start of the combustion phase for the combustion chamber assembly. FIGS. 8 to 11 similarly show the rotor piston continuing to rotate in the operating direction until reference lobe 130 returns to the position at which it is disposed at the combusting position for the first combustion chamber assembly. In some embodiments, it is possible for the compression and expansion phases for a combustion chamber assembly to be unequal in duration. In such cases, while the sum of the respective rotation angles of the rotor piston for each of the phases equals the rotation required to move a rotor piston lobe end from one combustion chamber assembly to the next, the compression and expansion phase rotation angles are different from one another.

The scavenging and compression phases for a combustion chamber assembly occur in the respective chambers that form in the direction that is opposite to the operating direction. The expansion phase occurs in the chamber that is formed in the direction of the operating direction. Further, as combustion takes some time to occur, it is expected that improved thermodynamic efficiency may be obtained for any combustion phase by beginning combustion slightly before lobe end 48 of rotor piston 12 aligns with combustion gate 62. In this manner, maximum pressure may be achieved when expansion begins for the respective combustion chamber assembly. The combustion event may extend into the early stages of the respective expansion phase.

Where rotor piston 12 comprises a single lobe having one lobe end, and the rotary engine includes one combustion chamber throughway 52 (as shown in FIGS. 13 to 17, 21, 22, and 24 to 27), the combustion process is generally as described above, but accounts for the reduced number of lobes and combustion chamber throughways. The rotor piston is disposed at combusting position 128 for the combustion chamber assembly when its lobe end is aligned with the piston-facing surface of combustion gate 62. The combustion phase begins when lobe end 48 moves to the combusting position. The combustion phase ends with combustion within combustion chamber 66 of the combustion chamber assembly.

The expansion phase for the combustion chamber assembly begins upon propulsion from the combusting position, by the combustion force, of rotor piston 12 toward the operating direction. Expansion gate 60 extends into piston chamber 34 so that its piston-facing surface (or roller bearing 208 thereof, described below) contacts rotor piston 12 to define expansion chamber 150. Where the operating direction is clockwise, the expansion chamber is that portion of piston chamber 34 that is counter-clockwise of the lobe (i.e., disposed adjacent the rotor piston lobe in the direction opposite to the operating direction). The expansion chamber is defined at least by rotor piston 12, interior stator surface 18, interior flange surfaces 138, piston-facing surfaces 70 of the compression and combustion gates, and interior walls 68 of the compression and expansion gates.

During further movement of the lobe in the operating direction, expansion gate 60 begins to retract into the combustion chamber throughway and compression gate 64 begins to move into piston chamber 34 at the end of the expansion phase. The end of the expansion phase coincides approximately with the beginning of the compression phase for the upcoming combustion event (clockwise of rotor lobe 46 where the operating direction is clockwise) and with the beginning of the scavenging phase (counter-clockwise of rotor lobe 46 where the operating direction is clockwise) for the next combustion event. During the scavenging phase, air intake port 24 and exhaust port 26 become uncovered by rotor piston 12 to permit the intake of air to the piston chamber and the exhaust of combustion products from the piston chamber.

In the single lobe/single combustion chamber throughway embodiment, the scavenging phase occurs simultaneously with the compression and expansion phases, which follow one another. Where the operating direction is clockwise, the scavenging phase occurs counter-clockwise of rotor lobe 46 during the compression phase, and clockwise of rotor lobe 46 during the expansion phase. As the compression phase begins, the compression gate piston-facing surface (or roller bearing 208 thereof, described below) contacts rotor piston 12 and the expansion gate becomes fully retracted into the combustion chamber throughway, thereby defining compression chamber 146. Where the operating direction is clockwise, the compression chamber is that portion of piston chamber 34 that is clockwise of the lobe (i.e., disposed adjacent the rotor piston lobe in the operating direction) and which is defined at least by rotor piston 12, interior stator surface 18, interior flange surfaces 138, piston-facing surfaces 70 of the expansion and combustion gates, and interior walls 68 of the compression and expansion gates. The compression phase for the combustion chamber assembly ends with the start of its combustion phase.

During an engine cycle, processor 96 executes the instructions on the computer-readable memory to cause the processor to determine the start of a compression phase for any particular combustion chamber assembly. That determination is typically based on the rotor piston position. The processor is further configured to cause the fuel injector associated with that combustion chamber assembly to inject fuel into compression chamber 146 at the start of, or at an early portion of, the compression phase for the combustion chamber assembly. In this manner, when compression occurs, it is of a pre-mixed, substantially homogenously charged, fuel-air mixture.

The amount of fuel to be injected is determined by processor 96 based on the inputs. The processor reads and analyzes the inputs during each engine cycle to make two primary determinations in order to achieve HCCI for each combustion chamber. These determinations are the amount of fuel to be injected, and the compression ratio required. Because re-positioning of the combustion gate takes longer than fuel injection, the ECU, for each combustion chamber assembly, causes the servo motor (or other servo mechanism) to begin the re-positioning of the combustion gate before it causes the fuel injector to inject fuel. This permits re-positioning over a sufficiently long rotation angle of the rotor piston in order to facilitate completion of the re-positioning by the time that the pre-determined amount of fuel is injected into the compression chamber.

In this way, the compression chamber exerts pressure on a fuel-air mixture having a predetermined amount of fuel charge, and combustion can take place in a combustion chamber having a predetermined combustion chamber volume. Optimal values of both the amount of fuel and the combustion chamber volume are determined to achieve HCCI during the respective combustion phase.

As can be seen in FIGS. 5 to 11, during operation, the rotor piston blocks and exposes the various intake ports as it rotates. For any particular combustion chamber assembly, scavenging takes place when the relevant intake port is not blocked. Scavenging ends when the intake port becomes blocked by the rotor piston. Similarly, the rotor piston blocks and exposes the exhaust ports during rotation of the rotor piston.

A system 300 for regulating the compression ratio of an HCCI rotary engine can therefore be provided that precludes intake and/or exhaust valves, the system including apparatus 10 in use with rotary engines 200 of the types described herein. It is expected that control by the processor of a valve-less system would be more easily achieved within the short time constraints required for regulating the apparatus to achieve HCCI, than of an engine employing valves for air intake and/or exhaust. Further, it is expected that such a system would be less prone to mechanical issues typically related to the use of moving valves.

In order to facilitate movement of the combustion gate to vary the compression ratio of the combustion chamber for any particular combustion chamber assembly, the processor may execute instructions on the computer-readable memory to cause the servo motor to begin a re-positioning of the respective combustion gate at the end of the expansion phase for the combustion chamber assembly. The processor further causes the servo motor to end the re-positioning during the early portion of the compression phase for the combustion chamber assembly. At this time, the processor causes the fuel injector associated with that combustion chamber assembly to inject fuel into the compression chamber for the combustion chamber assembly.

Because the end of a scavenging phase for a combustion chamber assembly is the start of the compression phase for the combustion chamber assembly, re-positioning is able to take place before compression begins (or at least the re-positioning ends just after the start of the compression phase). Therefore, at least a major part of the re-positioning is not subjected to the relatively high pressures exerted on the combustion gate during a compression phase. It is expected that the apparatus can re-position the combustion gate, based on the operating conditions, with minimal energy consumption. At least a bulk of the re-positioning for a particular combustion chamber assembly takes place during the scavenging phase, when the pressure exerted on the combustion gate is relatively low.

While FIGS. 5 to 11 show combustion gate regulation beginning and ending at certain times during an engine cycle, in some embodiments, it is possible to adjust the start and end times for combustion gate regulation to account for operating conditions. Further, the end of combustion gate regulation for a combustion chamber assembly can take place at a later time (i.e., during the early stages of the compression phase for the combustion chamber assembly). This is expected to be possible as the pressure exerted on the combustion gate during early stages of a compression phase is expected to be relatively low. For example, the end of combustion gate regulation could take place for the second combustion chamber assembly at the rotor position shown in FIG. 8, rather than that shown in FIG. 7.

Figure 15:
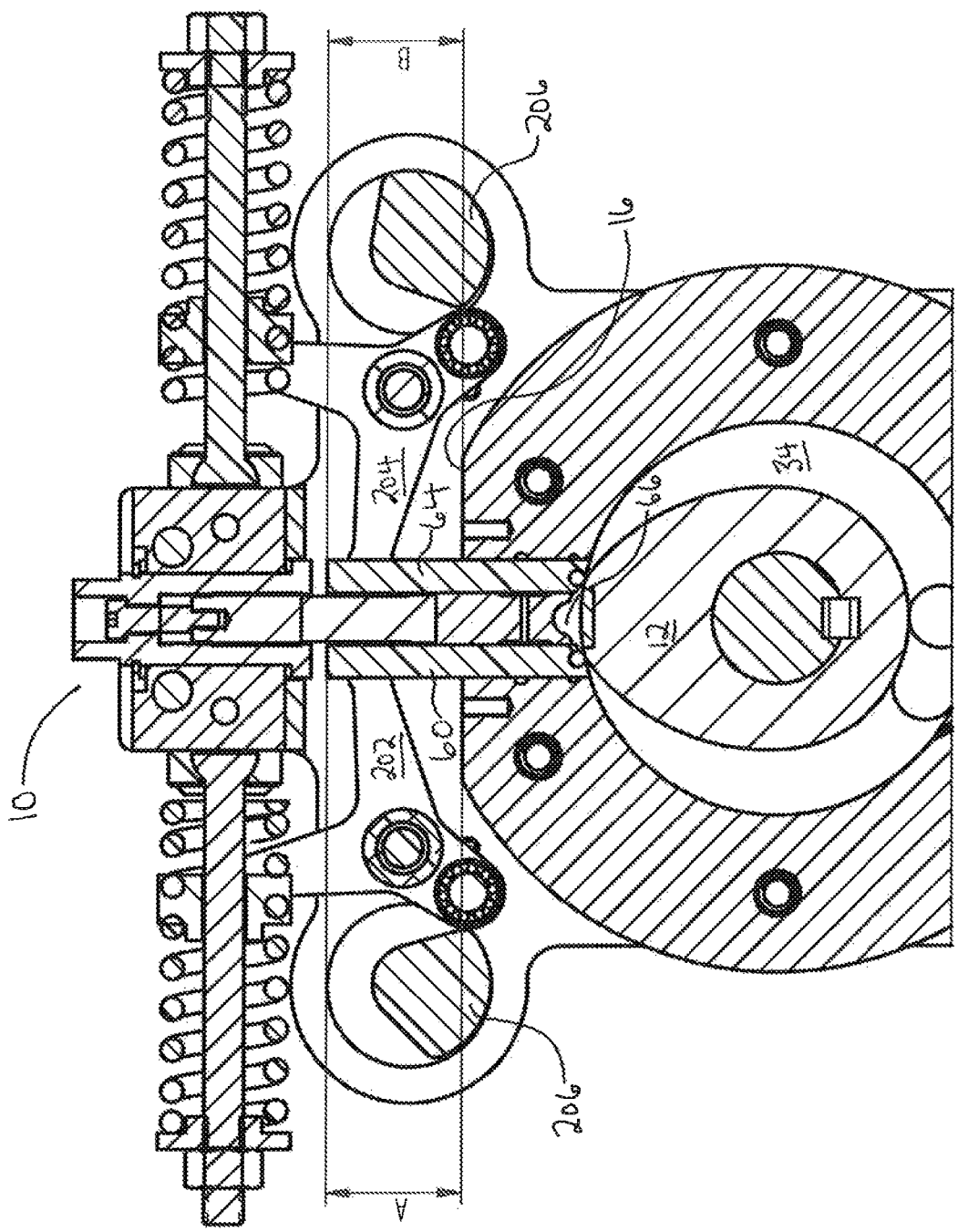
Figure 16:
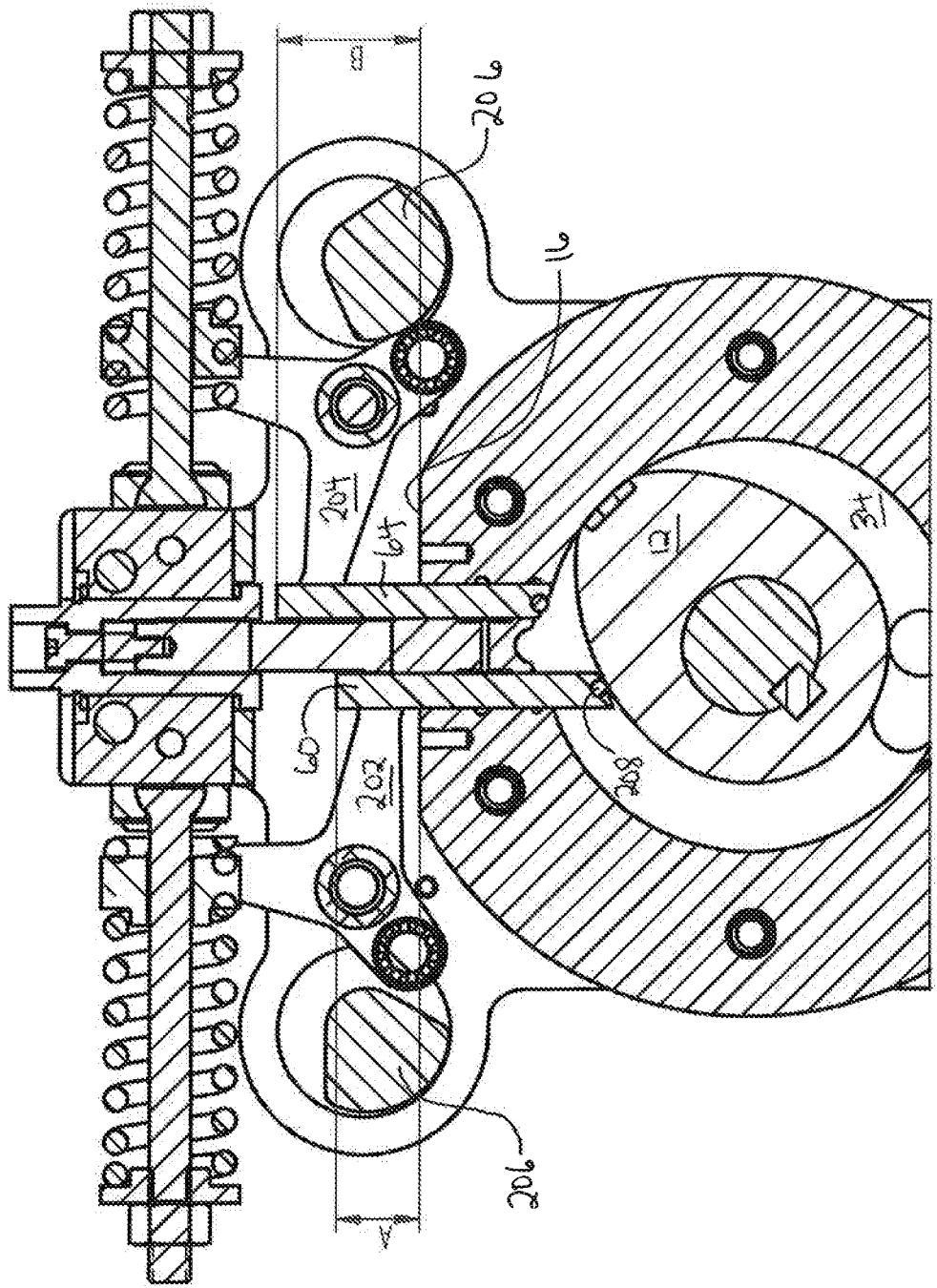
Figure 17:
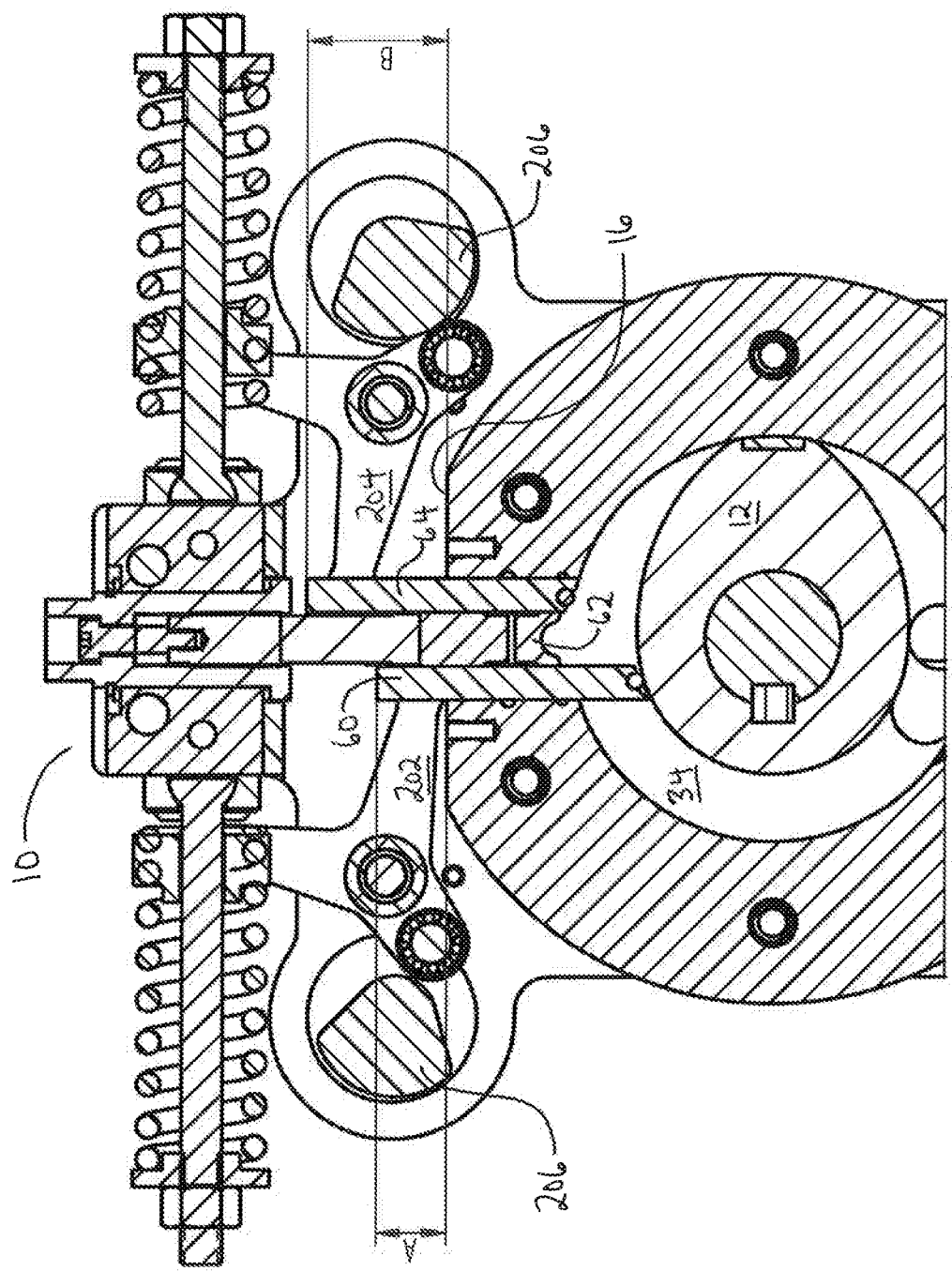
Figure 18:
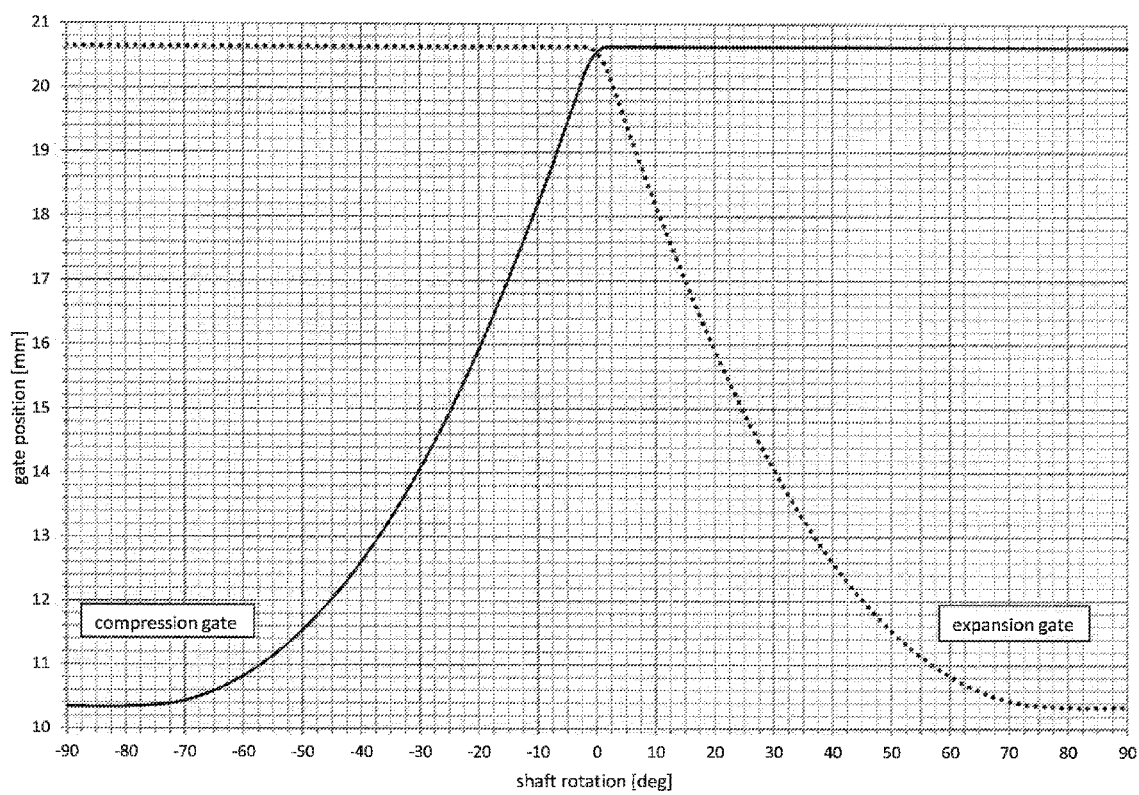
FIG. 18 is a graph depicting the position of the compression and expansion gates of the apparatus during rotation of the rotor piston as shown in FIGS. 13-17.
Figure 19:
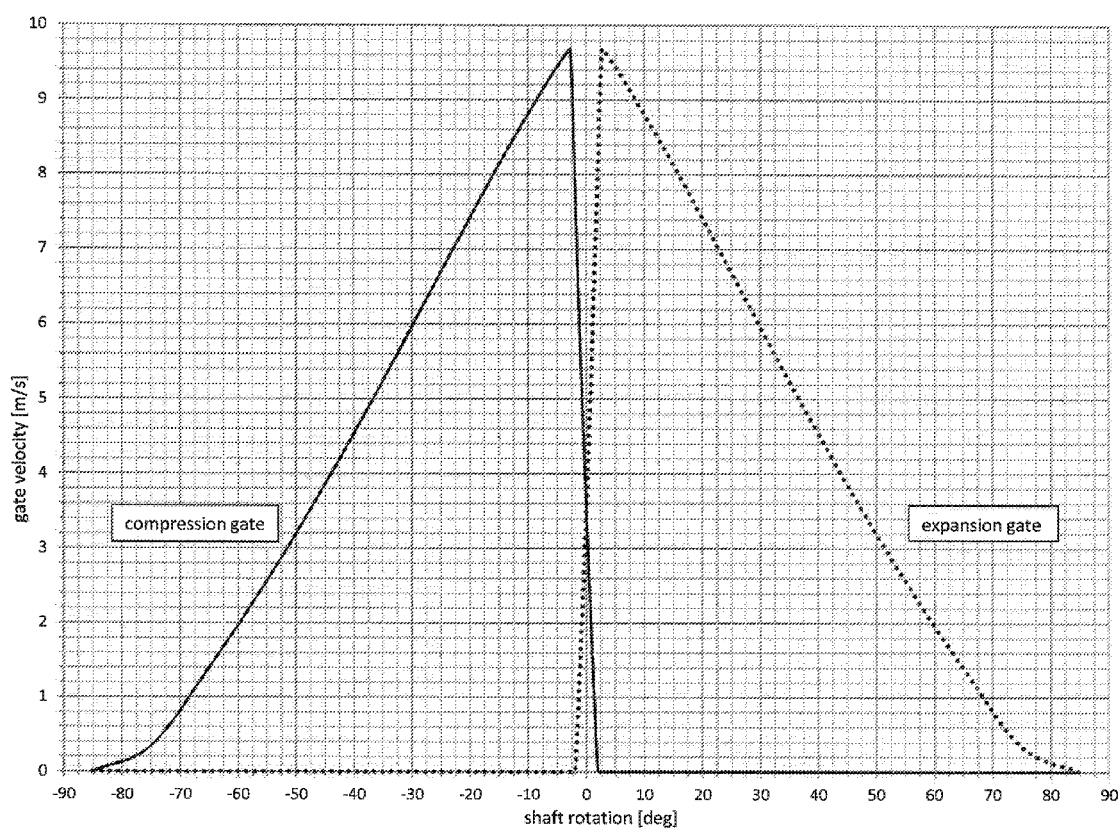
FIG. 19 is a graph depicting the velocity of the compression and expansion gates of the apparatus during rotation of the rotor piston as shown in FIGS. 13-17.
Figure 20:
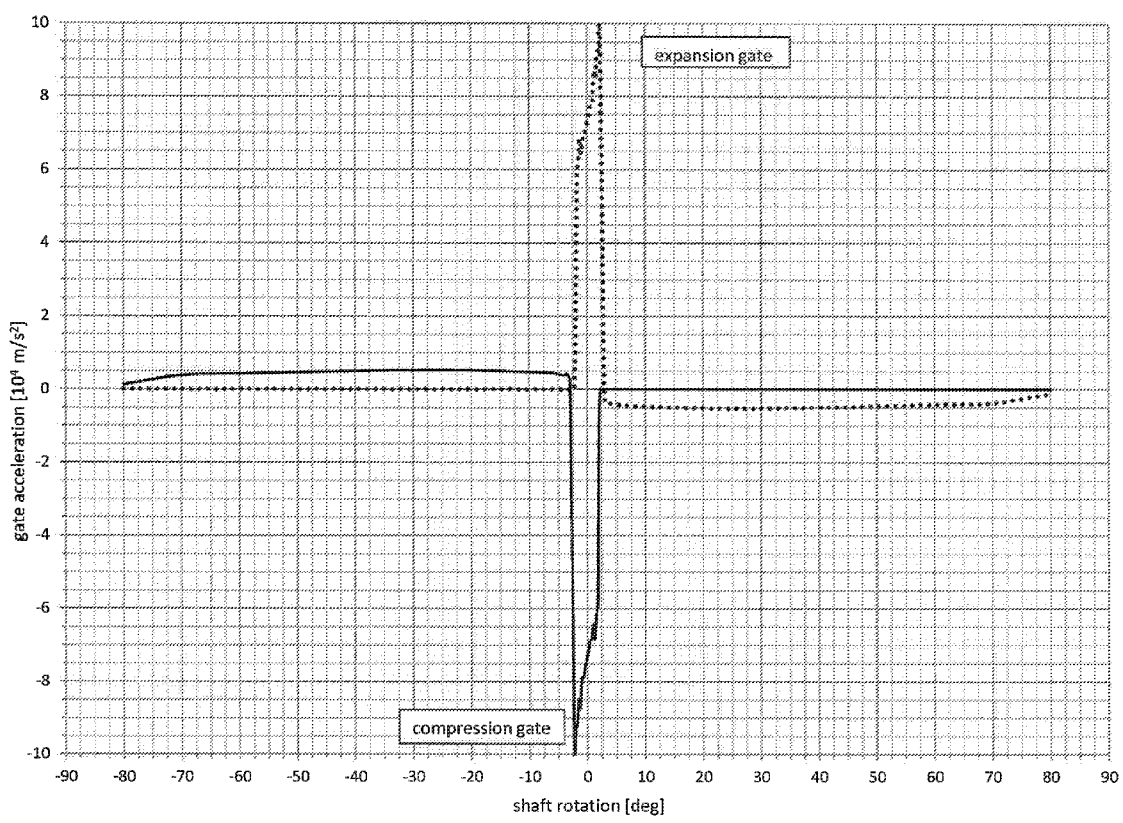
FIG. 20 is a graph depicting acceleration of the compression and expansion gates of the apparatus during rotation of the rotor piston as shown in FIGS. 13-17.

Referring to FIGS. 13 to 17 and 21 to 27, apparatus 10 is shown in association with a HCCI rotary engine with a single lobe rotor piston 12. FIGS. 13 to 17 depict single lobe rotor piston 12 rotating within piston chamber 34 in the operating direction (e.g., clockwise in the example shown) from a −90° shaft rotation or rotor piston position (FIG. 13) to a −45° position (FIG. 14) to a 0° position (FIG. 15) to a +45° position (FIG. 16) to a +90° position (FIG. 17). The graphs shown in FIGS. 18 to 20 depict the position, velocity, and acceleration of the expansion gate (shown in dashed line) and the compression gate (shown in solid line) of apparatus 10 during the movement of rotor piston 12 through the partial rotation shown in FIGS. 13 to 17, at 6000 revolutions per minute (rpm). It will be appreciated that apparatus 10 may exhibit gate position, velocity, and acceleration measurements other than those shown in FIGS. 18 to 20 depending on various factors, including the specific dimensions of the components of apparatus 10 and of the rotary engine, and the rpm of the rotor piston.

Figure 13:
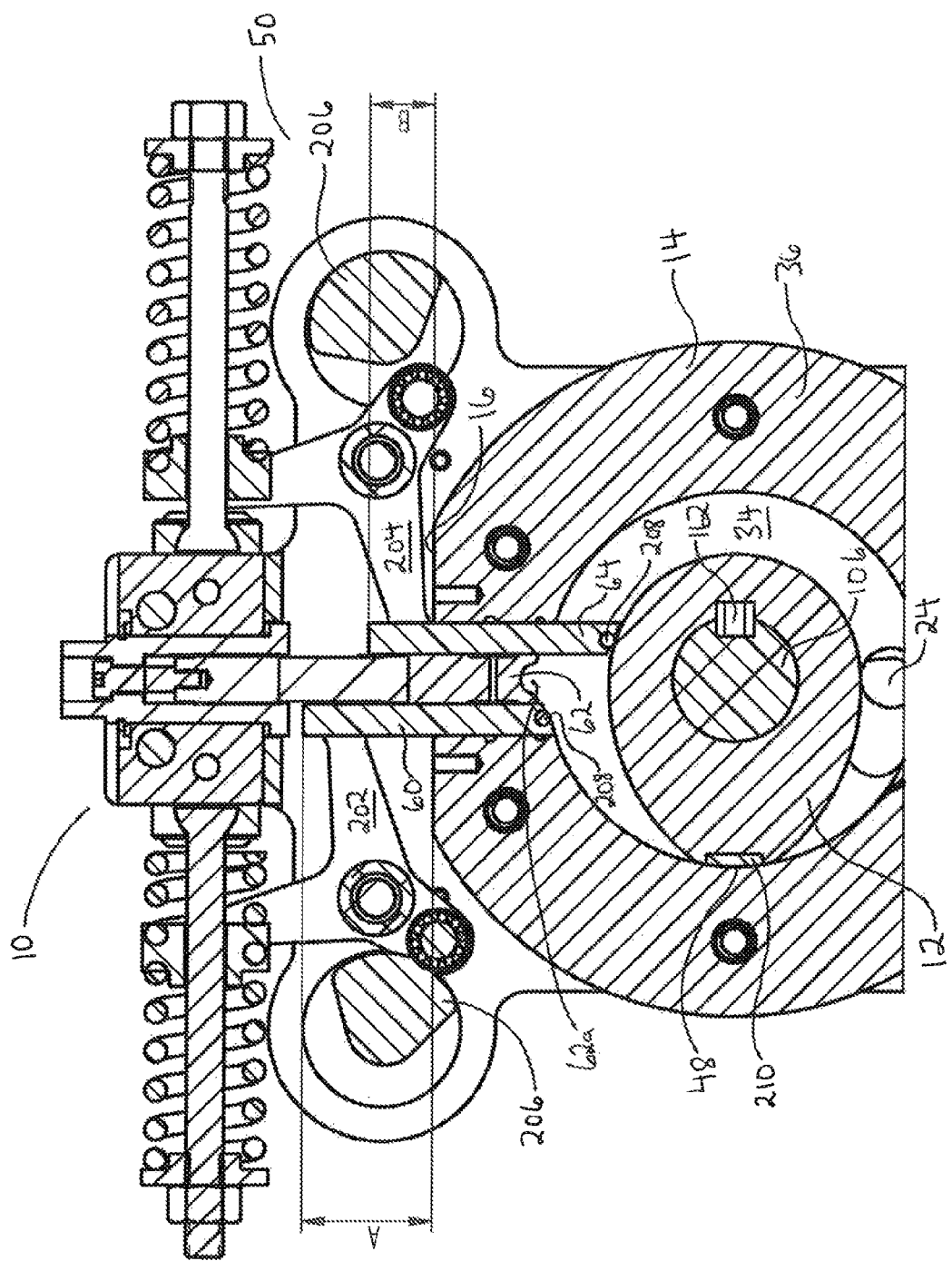
FIGS. 13-17 show cross-sectional views of a single lobe rotor piston HCCI rotary engine with an alternate embodiment of the apparatus for regulating HCCI compression ratio, the rotor piston shown at various stages during an engine cycle.
Figure 14:
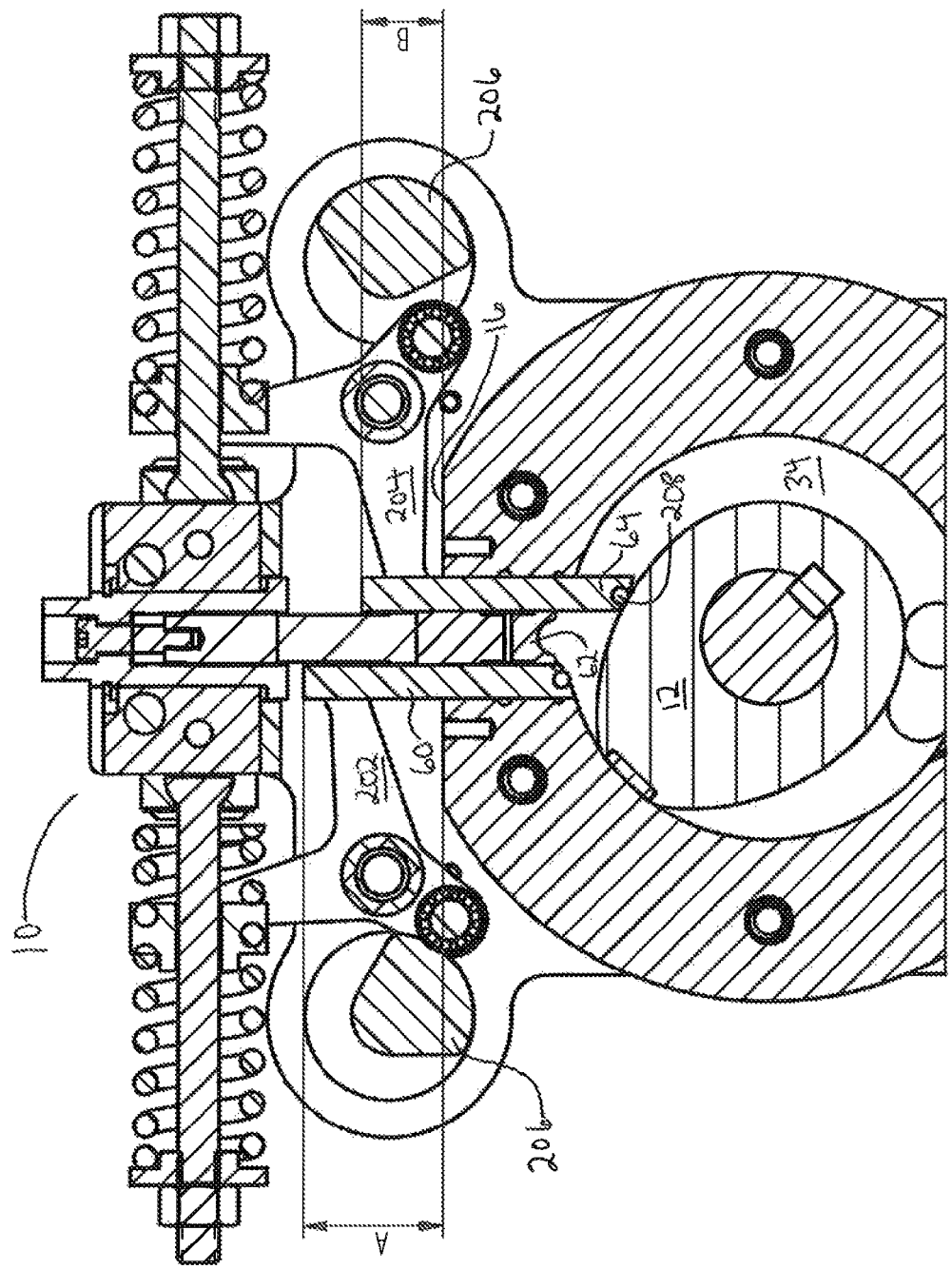

In FIGS. 13 to 17, the distance at any point in time by which expansion gate 60 and compression gate 64 protrude beyond exterior stator surface 16 of stator 14 is referenced by "A" and "B", respectively. To provide a further understanding of the operation and function of the component parts of apparatus 10, one particular possible embodiment, having particular dimensions, is described below. It will be appreciated that other embodiments may exhibit other measurements, dimensions, etc. Referring to FIGS. 13 and 18, when rotor piston 12 is at the −90° position, distance "B" of compression gate 64 is approximately 10.3 mm, and distance "A" of expansion gate 60 is approximately 20.6 mm. Referring to FIGS. 14 and 18, when rotor piston 12 is at the −45° position, distance "B" of compression gate 64 increases to approximately 12 mm, while distance "A" of expansion gate 60 remains unchanged at approximately 20.6 mm, as the expansion gate has not yet been displaced from its prior position by controlling element 202. Referring to FIGS. 15 and 18, when rotor piston 12 is at the 0° position, distances "A" and "B" are slightly less than 20.6 mm, as both gates are almost fully retracted from the piston chamber at this time. This is depicted in FIG. 18 by the intersection of the compression and expansion gate lines at the 0° shaft rotation position. Referring to FIGS. 16 and 18, when rotor piston 12 is at the +45° position, distance "A" of expansion gate 60 decreases to approximately 12 mm as the expansion gate moves into the piston chamber, while distance "B" of compression gate 60 remains unchanged at approximately 20.6 mm as the compression gate is not at this point displaced from its prior position by controlling element 204. Referring to FIGS. 17 and 18, when rotor piston 12 is at the +90° position, distance "A" of expansion gate 60 decreases to approximately 10.3 mm as the expansion gate moves further into the piston chamber, while distance "B" of compression gate 60 still remains unchanged at approximately 20.6 mm.

FIG. 19 depicts the velocity of the gates, for one specific embodiment, as the rotor piston moves through the partial rotation shown in FIGS. 13 to 17. The peak compression gate 64 velocity is achieved just before the rotor piston reaches the 0° shaft rotation position, when it is approximately at the −2.5° position, for example. The peak expansion gate 60 velocity is achieved shortly after the rotor piston passes the 0° shaft rotation position, when rotor piston 12 is approximately at the +2.5° position, for example.

FIGS. 18 (depicting gate positions) and 19 (depicting gate velocities) are symmetrical about the 0° shaft rotation position at which point the rotor apex or distal lobe end 48 of the rotor piston faces combustion gate 62. The acceleration graph shown in FIG. 20 is not symmetrical about the 0° shaft rotation position, as compression gate 64 decelerates at the end of its upward stroke, just as the rotor piston approaches the 0° position, while expansion gate 60 accelerates just as it begins its downward stroke into the piston chamber. The deceleration (of the compression gate) and acceleration (of the expansion gate) are highest at these points (shown in FIG. 20 at the −2.5° and +2.5° shaft rotation positions, respectively). These peaks in acceleration and deceleration produce significant forces.

Figure 21:
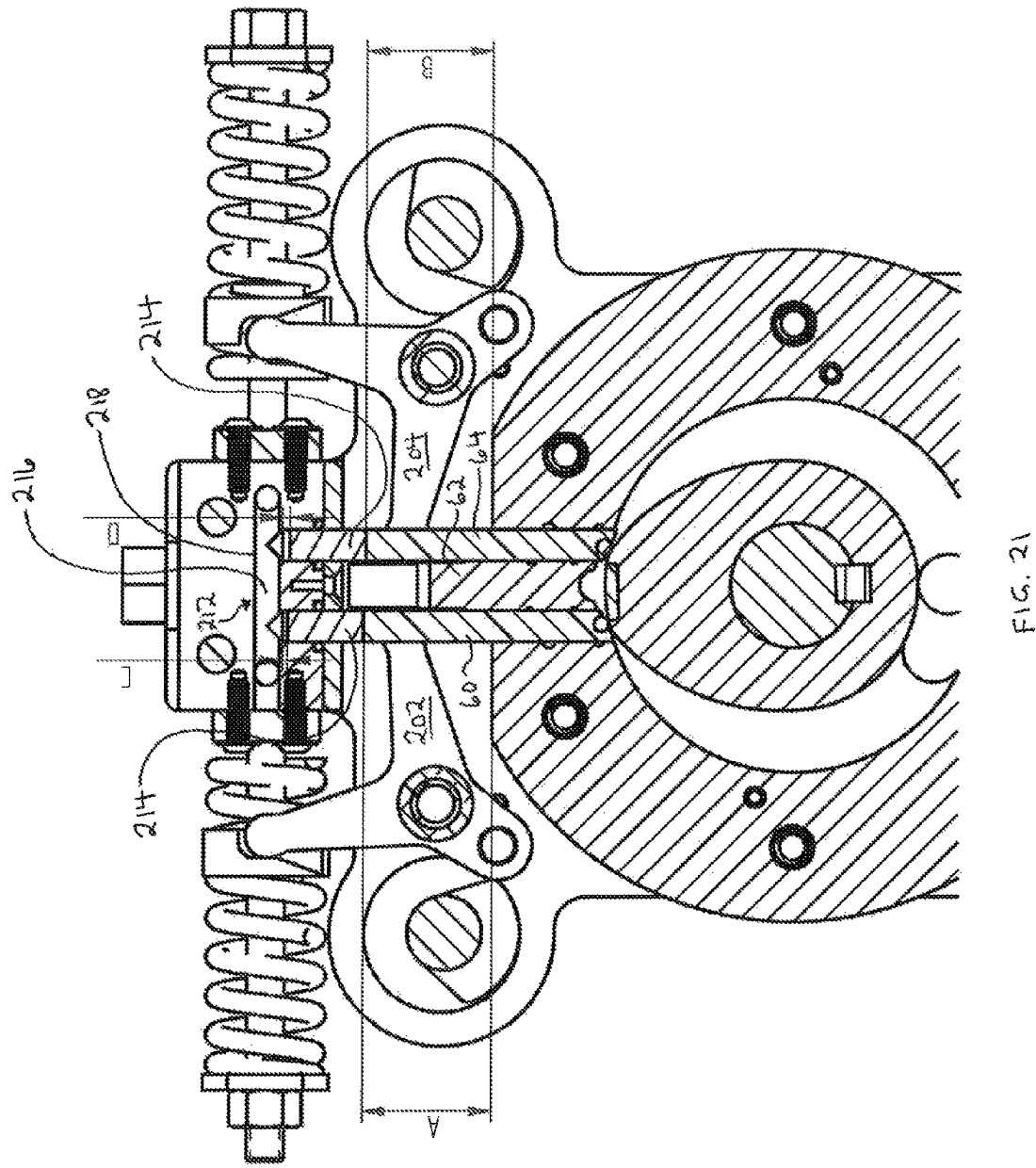
FIGS. 21 and 22 show magnified cross-sectional views of a single lobe rotor piston HCCI rotary engine with an alternate embodiment of the apparatus shown in FIGS. 13 to 17 which includes an energy transfer mechanism.
Figure 22:
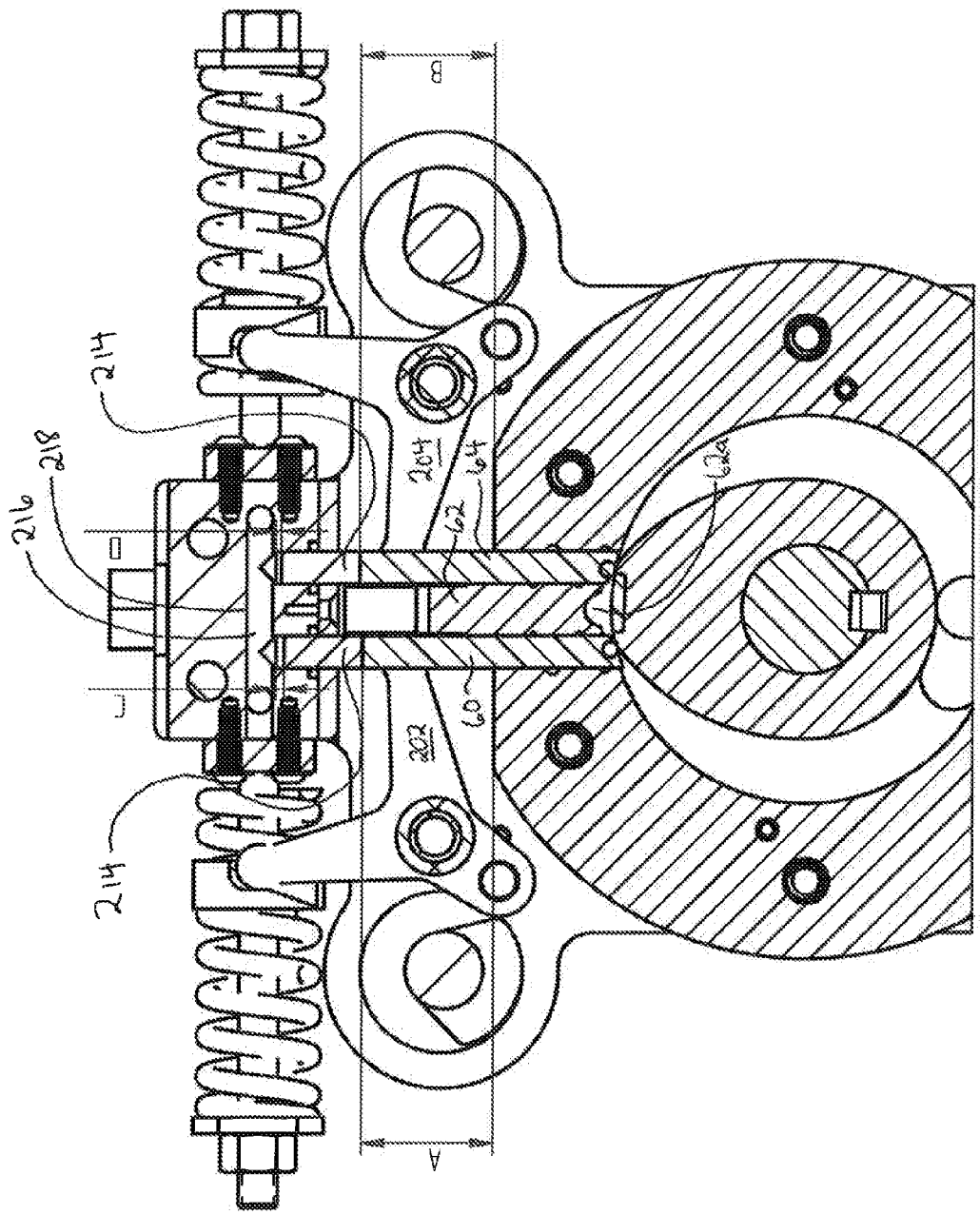
Figure 23:
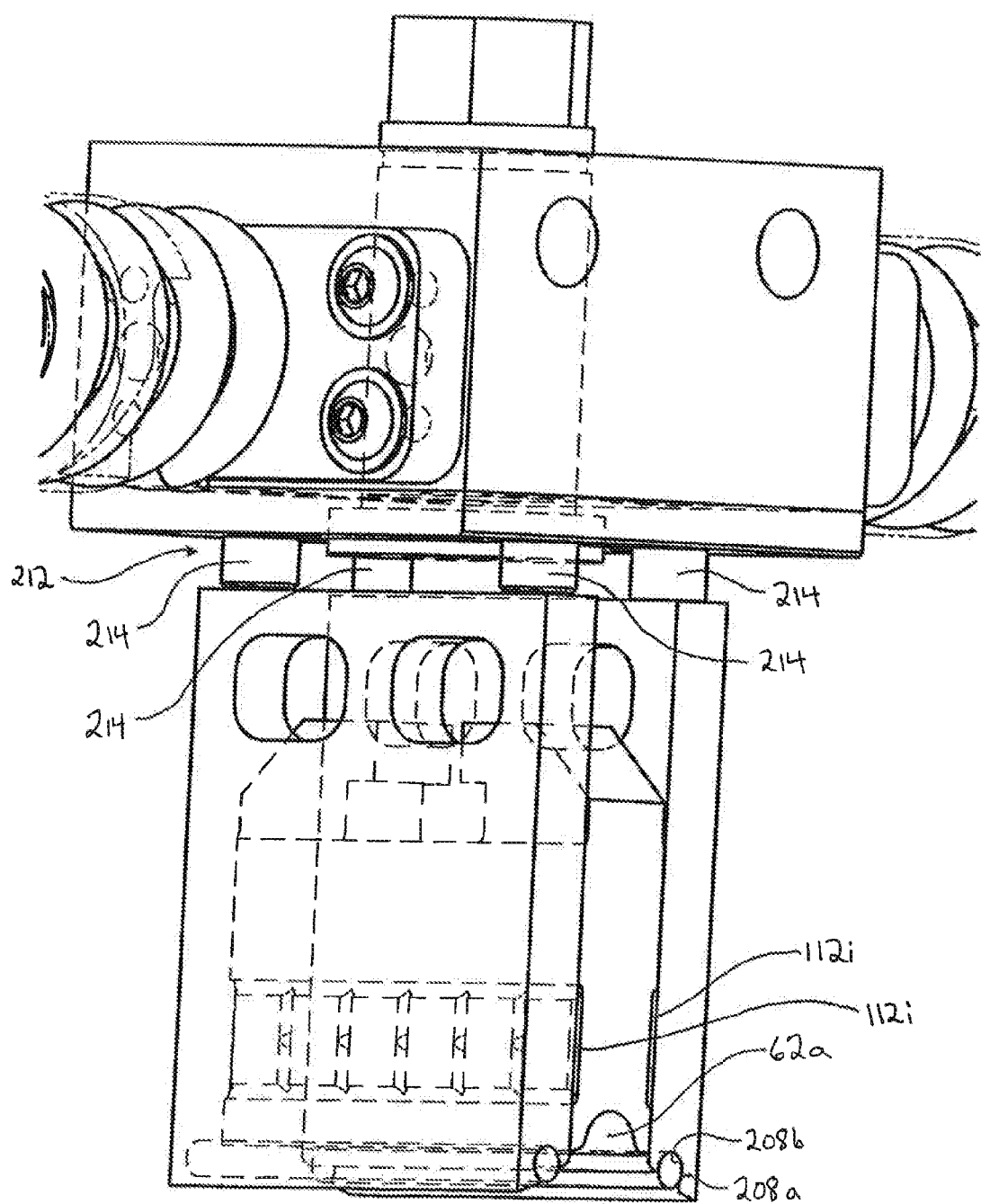
FIG. 23 is a front perspective view of the apparatus shown in FIGS. 21 and 22.

Referring to FIGS. 21 to 23, in order to mitigate the effect of the acceleration/deceleration forces on system 300, apparatus 10 may include energy transfer mechanism 212. Rotary engine 200 and apparatus 10 are configured such that the compression gate begins its deceleration just before the expansion gate begins its acceleration. In this manner, energy transfer mechanism 212 can be utilized to couple the deceleration of compression gate 64 to the acceleration of expansion gate 60. In other words, the energy transfer mechanism may absorb a portion of the kinetic energy of the compression gate, slowing it down as the rotor piston approaches the 0° shaft rotation position, and then transfer it to the expansion gate to thereby accelerate it downward. Energy transfer mechanism 212 may therefore facilitate the synchronous movement of the expansion and compression gates by reducing the energy required to achieve the gate movement by the controlling elements.

Energy transfer mechanism 212 is shown in FIGS. 21 to 23 as a hydraulic system, although other means for transferring kinetic energy between the gates may be used (e.g., springs, gears, etc.). In the embodiment shown, energy transfer mechanism 212 includes at least one hydraulic piston 214 for each of the expansion and compression gates. Piston(s) 214 are in communication with hydraulic fluid 216 within hydraulic fluid channel 218. The piston(s) for each of the compression and expansion gates are adjacent to and aligned with their respective gates, opposite piston-facing surfaces 70. As such, the piston(s) for each gate engage the fluid channel at opposite ends of the channel, so that upward movement of one set of pistons pressurizes the hydraulic fluid to thereby facilitate downward movement of the other set of pistons. The embodiment shown in the attached figures includes two pistons for each of the expansion and compression gates, as shown in FIG. 23.

FIG. 21 shows the rotor piston approximately at the −2.5° shaft rotation position, and FIG. 22 shows the rotor piston approximately at the +2.5° shaft rotation position. Referring to FIG. 21, hydraulic pistons 214 aligned with compression gate 64 are engaged by the compression gate just before the gate ends its upward stroke, when it is at its peak velocity (shown in the attached figures, e.g., approximately at the −2.5° shaft rotation or rotor position). At this moment, the pistons aligned with the expansion gate are engaged with the expansion gate, and distance "D" is greater than distance "C". Referring to FIG. 22, once compression gate 64 engages the corresponding pistons 214, further upward movement of the compression gate decreases the distance "D" between the pistons and fluid channel 218, pressurizing hydraulic fluid 216 within fluid channel 218 to thereby cause a downward force on the pistons aligned with the expansion gate (increasing distance "C"). The expansion gate hydraulic pistons thereby facilitate downward movement of expansion gate 60 by exerting a force that is a function of that exerted on the compression gate. The energy transfer from the compression gate to the expansion gate persists until the compression gate's upward motion ceases and the expansion gate has moved downward to the extent of the full stroke of its hydraulic piston(s) (shown in FIG. 22 approximately at the +2.5° shaft rotation or rotor position, for example).

A fluid volume adjustment mechanism (not shown) may be included in the hydraulic energy transfer mechanism, such as one or more screws operably engaged with fluid channel 218. Where a screw is used, for example, it may be screwed into the fluid channel to varying degrees to thereby reduce the fluid channel volume and accordingly extend hydraulic pistons 214 downward, away from fluid channel 218. In the embodiment shown in FIGS. 21 and 22, the energy transfer mechanism engages and disengages the gates approximately at the −2.5° and +2.5° rotor positions, respectively. Extending the pistons away from the fluid channel, toward the gates, would result in the coupling of the gates across a larger angle of shaft rotation. For example, compression gate pistons 214 may engage the compression gate at the −3° shaft rotation or rotor position, rather than at the −2.5° position. In a similar fashion, increasing the fluid channel volume (by retracting the screw from the fluid channel) would cause the pistons 214 to retract or move upward, toward the fluid channel, thereby delaying the point at which engagement between the compression gate and its piston(s) occurs. In other words, retracting the pistons toward the fluid channel, away from the gates, would result in the coupling of the gates across a smaller angle of shaft rotation. For example, compression gate pistons 214 may engage the compression gate at the −1° shaft rotation or rotor position, rather than at the −2.5° position.

In embodiments utilizing energy transfer mechanism 212, lobe end 48 will be approximately as wide as the respective combustion gate so as to permit the downward movement of expansion gate 60 just before the upward movement of compression gate 64 ceases. The energy transfer from the compression gate to the expansion gate occurs generally in the timeframe during which both such gates are moving.

Further, while the figures show the same number and size of pistons 214 corresponding to each of the compression and expansion gates, it may be desirable to vary the number and/or size of pistons for one gate versus the other, to make the engagement strokes and forces unequal between the compression and expansion gates.

The energy transfer mechanism may significantly reduce the force required to operate the expansion and compression gates by the controlling elements. As a result, the mechanism may also reduce internal engine friction and component sizes. For example, larger springs may be required where the energy transfer mechanism is not utilized.

Referring to FIGS. 24 to 27, apparatus 10 may include a lubrication and sealing mechanism 220, having fluid passages 112. In the embodiment shown in FIGS. 25 to 27, lubrication and sealing mechanism 220 includes fluid inlet 112a, stator inlet passage 112b, compression gate passages 112c, combustion gate passages 112d, combustion gate transfer passages 112e, expansion gate passages 112f, stator outlet passage 112g, and fluid outlet 112h.

Figure 25:
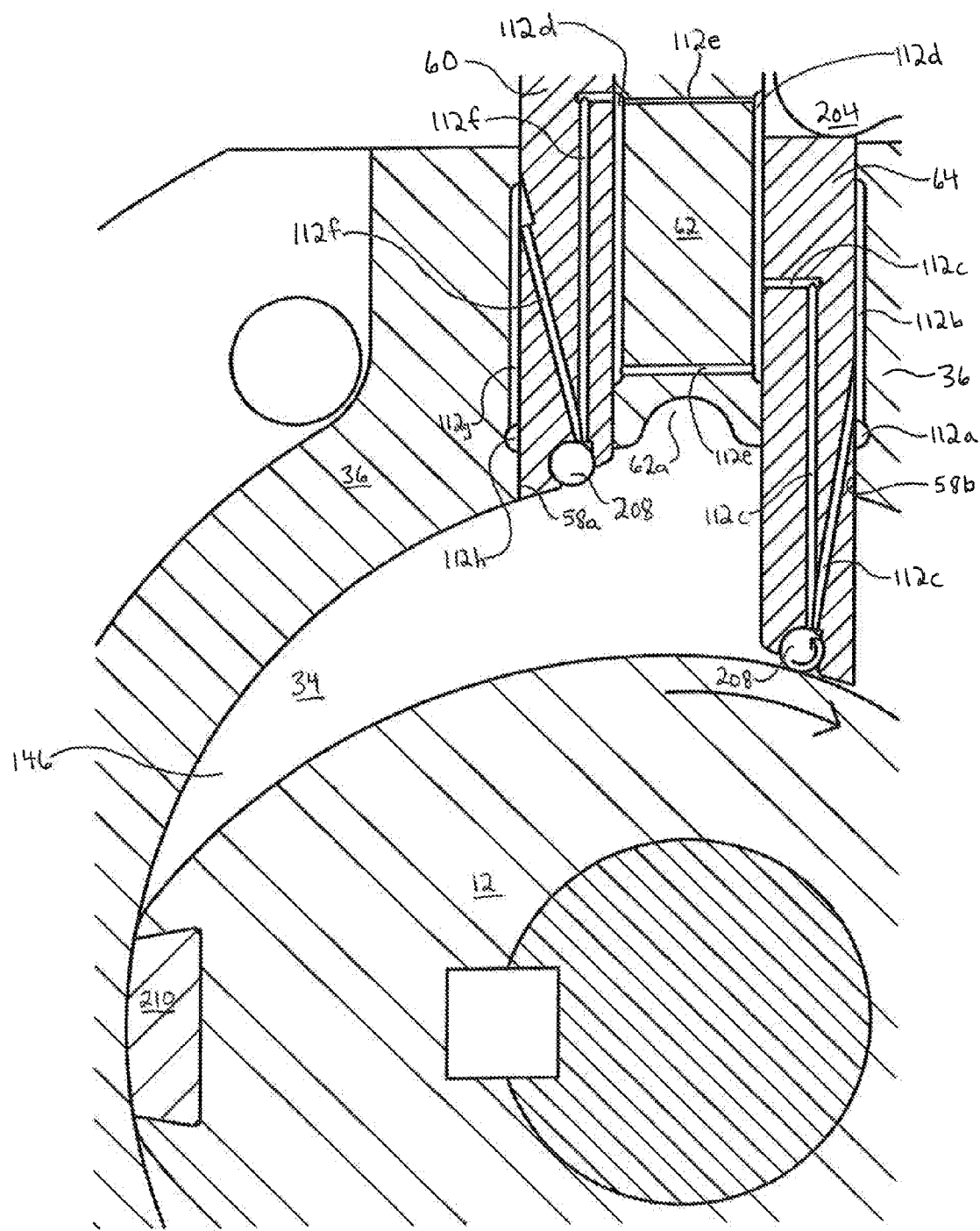
FIG. 25 is a magnified view of the apparatus of FIG. 24 during a compression phase.

Lubricating and/or sealing fluid is introduced under pressure to apparatus 10 from an external source (not shown) at fluid inlet 112a. While apparatus 10 is in operation, the fluid flows through stator inlet passage 112b, to compression gate passages 112c, to combustion gate passages 112d and 112e, to expansion gate passages 112f, to stator outlet passage 112g, and finally through fluid outlet 112h. The fluid may then be cooled and/or cleaned and re-circulated back to fluid inlet 112a. The stator inlet and outlet passages 112b and 112g, respectively, may be formed in the interior combustion chamber throughway walls 58 that are adjacent the expansion and compression gates (i.e., throughway walls 58a and 58b, as shown in FIG. 25).

Apparatus 10 may include a roller bearing 208, for contacting rotor piston 12, distally arranged on each of the expansion and compression gates such that bearings 208 are located adjacent the piston-facing surfaces of the expansion and compression gates. The arrows in FIGS. 24 to 27 show the direction of rotation of various elements of apparatus 10 as rotor piston 12 rotates in the operating direction (e.g., clockwise in the example shown). As rotor piston 12 rotates, so too do the roller bearings to thereby facilitate passage of the gates over the rotor piston surface. Further, as shown in FIGS. 25 and 27, piston-facing surfaces 70 of the expansion and compression gates may be sloped to help facilitate sealed contact with rotor piston 12.

Stator inlet passage 112b is "open" to adjacent compression gate 64 substantially along the length of passage 112b. Combustion gate passages 112d are similarly "open" to their adjacent gates. Stator outlet passage 112g is also "open" to adjacent expansion gate 60 substantially along the length of passage 112g. Further, compression gate and expansion gate passages 112c and 112f, respectively, are in fluid communication with their respective roller bearings 208. As such, as pressurized fluid flows through the various passages, it lubricates and seals the contact surfaces between (i) compression gate 64 and interior throughway wall 58b, (ii) compression gate 64 and combustion gate 62, (iii) combustion gate 62 and expansion gate 60, (iv) expansion gate 60 and another interior throughway wall 58a, and (v) roller bearings 208 and rotor piston 12. The pressurized fluid may create a thin film between these various surfaces to provide lubrication and to facilitate their relative movement. The fluid also helps to provide a seal to substantially seal compression chamber 146 (see, e.g., FIG. 25), combustion chamber 66 (see, e.g., FIG. 26), and expansion chamber 150 (see, e.g., FIG. 27). The seals provided by the fluid may be hydrostatic and/or hydrodynamic seals.

The pressurized fluid may also act as a cooling medium, absorbing heat and thereby facilitating heat dissipation from the combustion chamber and from the various contacting surfaces.

Figure 24:
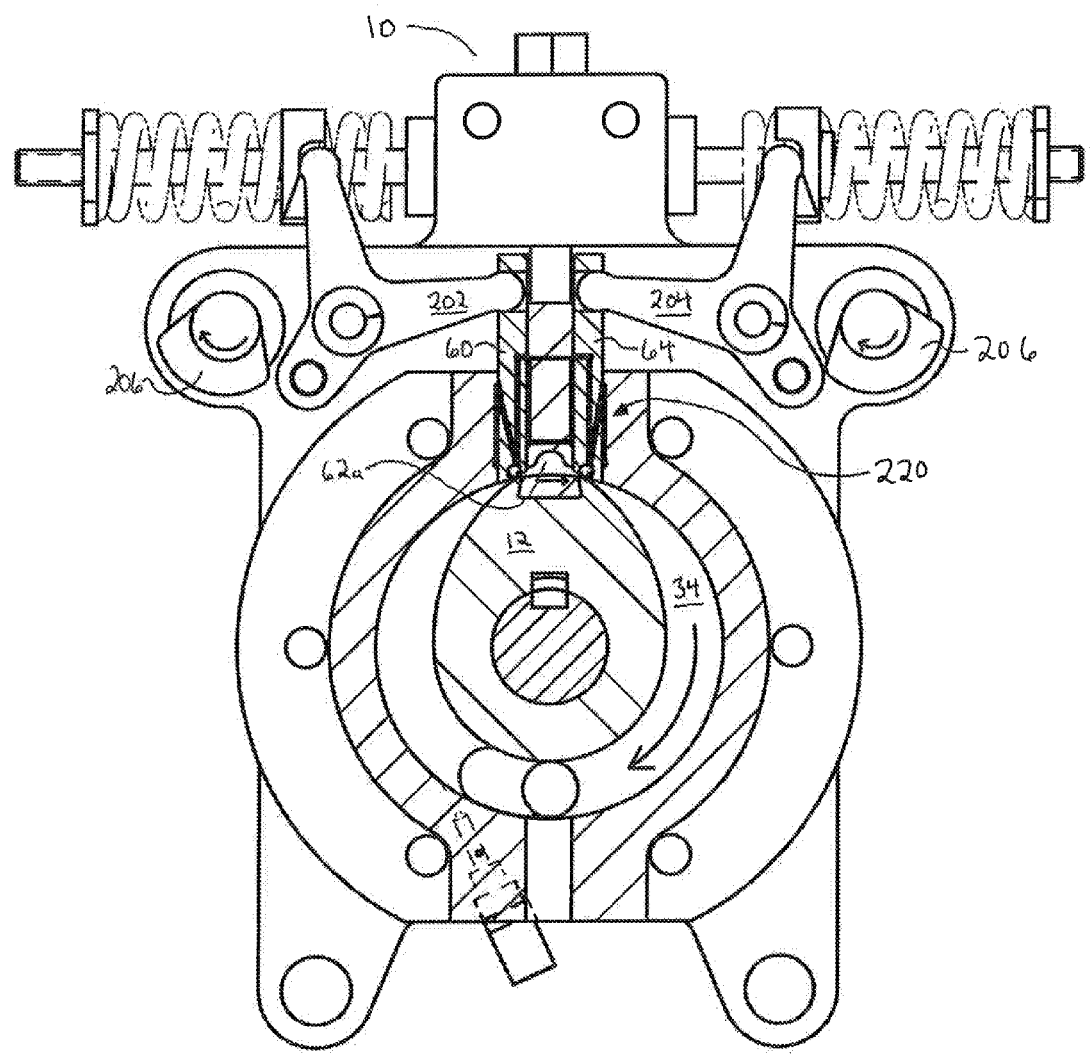
FIG. 24 shows a cross-sectional view of a single lobe rotor piston HCCI rotary engine with an alternate embodiment of the apparatus shown in FIGS. 13 to 17 which includes a lubrication and sealing system.

Referring to FIGS. 24 and 25, during the compression phase, gate controlling element 204 maintains roller bearing 208 of compression gate 64 in contact with rotor piston 12. As will be appreciated, bearing 208 will be encompassed by a very thin layer of lubricating fluid. The seal created between the roller bearing 208 and the rotor piston substantially seals compression chamber 146 thereby allowing fresh charge taken in during the scavenging phase to be compressed by rotor piston 12 in the compression chamber. During this phase, cam-like element 206 and controlling element 202 of expansion gate 60 maintain the expansion gate in its retracted position so that its roller bearing 208 does not contact the rotor piston. Further, because stator inlet passage 112b is open substantially along its length to the adjacent compression gate 64, compression gate passages 112c remain in fluid communication with stator inlet passage 112b during all or substantially all of the full stroke of the compression gate.

Figure 26:
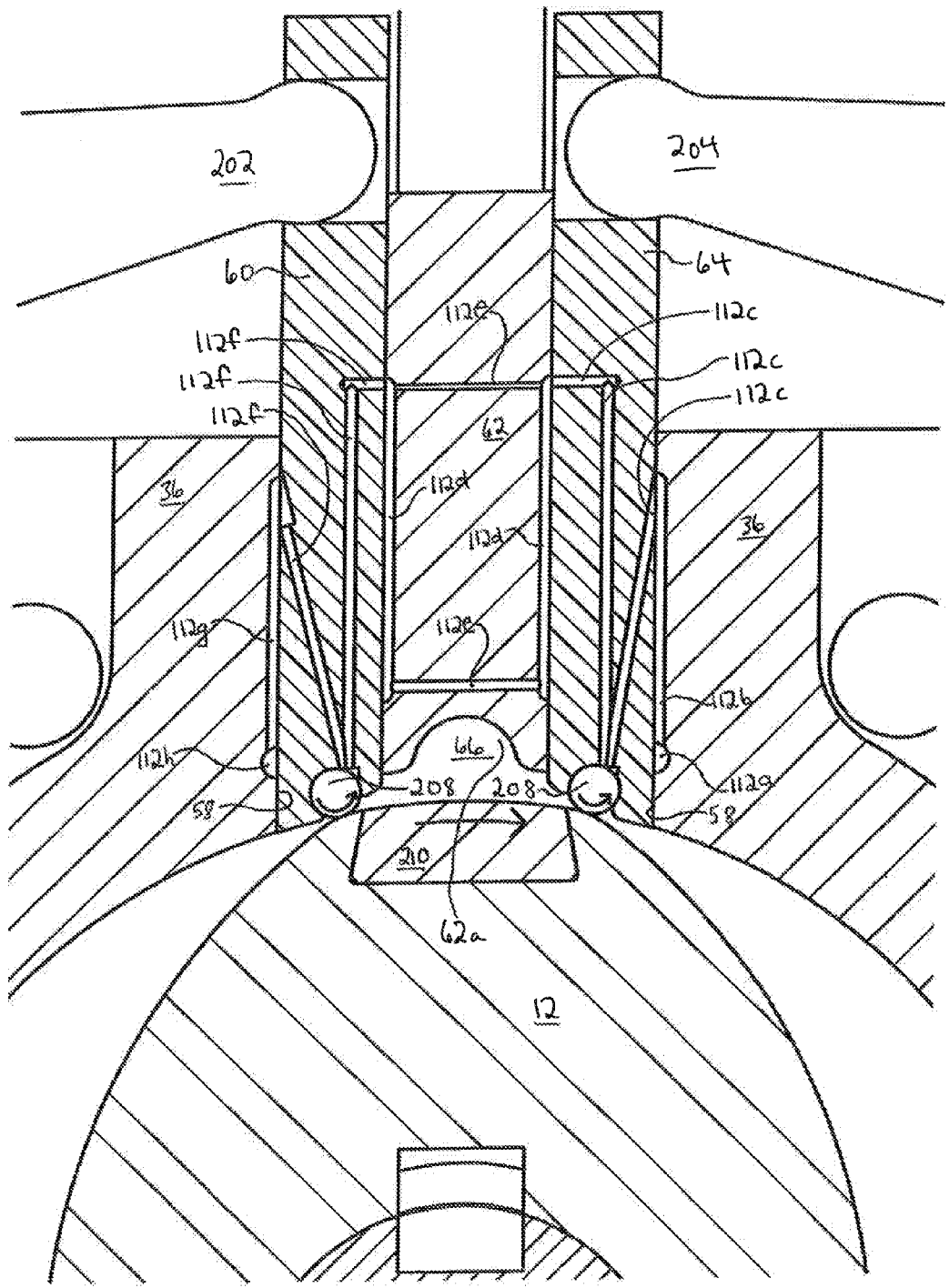
FIG. 26 is a magnified view of the apparatus of FIG. 24 during a combustion phase.
Figure 27:
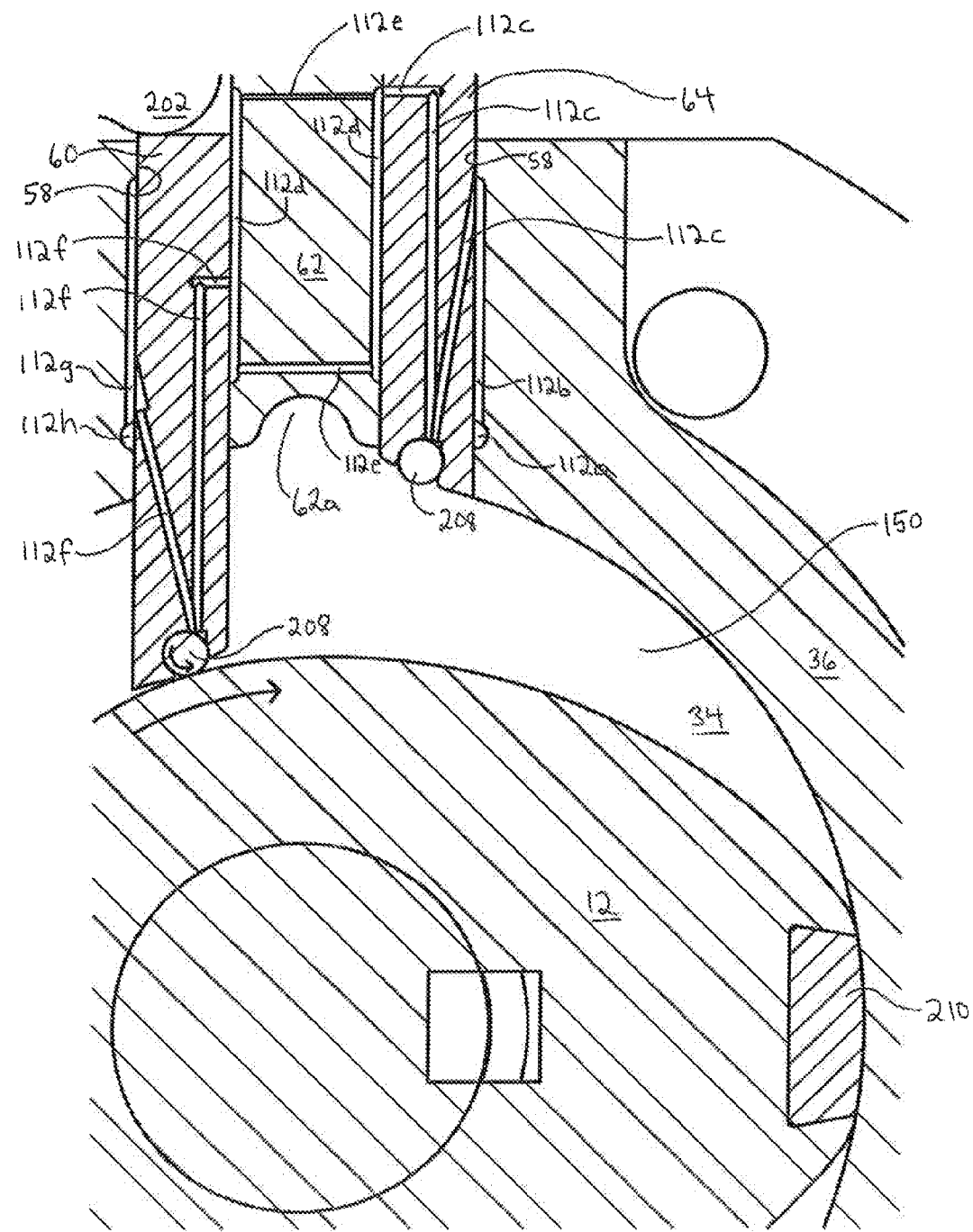
FIG. 27 is a magnified view of the apparatus of FIG. 24 during an expansion phase.

Referring to FIG. 26, during the combustion phase, gate controlling elements 202 and 204 maintain roller bearings 208 of expansion gate 60 and compression gate 64, respectively, in contact with rotor piston 12. The seals created between the roller bearings 208 and the rotor piston substantially seal combustion chamber 66 to develop the pressure required for combustion to take place. Further, because combustion gate passages 112d are open substantially along their lengths to their adjacent gates, combustion gate passages 112d and 112e remain in fluid communication with compression gate passages 112c and expansion gate passages 112f over the full range of motion of the combustion gate.

Referring to FIG. 27, after combustion, and during the expansion phase, gate controlling element 202 maintains roller bearing 208 of the expansion gate in contact with rotor piston 12. The seal provided between roller bearing 208 of the expansion gate and the rotor piston facilitates the transfer of energy from the expanding hot combustion gases within expansion chamber 150 to the rotor piston to facilitate its rotation. During this phase, cam-like element 206 and controlling element 204 of compression gate 64 maintain the compression gate in its retracted position so that its roller bearing 208 does not contact the rotor piston. Further, because stator outlet passage 112g is open substantially along its length to adjacent expansion gate 60, expansion gate passages 112f remain in fluid communication with outlet passage 112g during all or substantially all of the full stroke of the expansion gate.

Lubrication and sealing mechanism 220 is therefore configured in a manner that promotes continuous fluid flow, as passages 112 remain substantially uninterrupted no matter the position of the expansion, combustion or compression gates. Fluid passages 112a and 112h may extend from third throughway wall 58c to fourth throughway wall 58d (which may, in some embodiments, be interior flange surfaces 138 (shown, e.g., in FIGS. 4 and 5) of intake flange 22 and opposite side flange 32, respectively). In some embodiments, lubrication and sealing mechanism 220 may further include one or more passages 112i on each side of combustion gate 62. Passages 112i are shown in FIG. 23 without the other passages (112a through 112h) for improved visual clarity. Lubrication and sealing mechanism 220 may further lubricate and seal the contact surfaces between throughway walls 58c and 58d, and the expansion, combustion and compression gates. Similar to passages 112a and 112h, passages 112i may extend from third throughway wall 58c to fourth throughway wall 58d.

Rotor piston 12 may include one or more rotor apex seal 210 on its distal lobe end 48 (or, where the rotor piston has two lobe ends, on each of the distal lobe ends 48). Apex seal 210 may be formed from a material that is more conducive to lubrication and/or sealing than the remainder of the rotor piston. The distal lobe end(s) 48, and the apex seal(s) 210, may become lubricated during operation of apparatus 10 by lubrication and sealing mechanism 220, and in particular, by the fluid-coated roller bearings 208.

The distal lobe end(s) and apex seal(s) may alternately, or additionally, be lubricated and/or sealed by a separate mechanism (not shown) that injects lubricating/sealing fluid onto interior stator surface 18 such that the distal lobes ends become coated with the fluid. Further, apparatus 10 may be lubricated by lubricant contained in the intake charge.

While the attached figures depict a single lobe rotor piston rotary engine having a single combustion chamber assembly 50, apparatus 10 may also utilize roller bearings 208, rotor apex seal 210, energy transfer mechanism 212, and/or lubrication and sealing mechanism 220 with a single lobe rotor piston rotary engine having more than one combustion chamber assembly 50, or with the previously described double-lobe rotor piston rotary engine having one or more combustion chamber assemblies 50.

In some embodiments, exhaust gas recirculation (EGR) can be achieved by associating a valve (not shown) with each exhaust port. The valve may choke the port during scavenging or may close the exhaust port prematurely (i.e., before it is closed by the rotor piston), thereby shortening the respective scavenging phase in order to retain more exhaust gases within the piston chamber. The valve may be controlled by processor 96. The degree of port choking or how early the respective exhaust port is closed would be a determination made by the processor based on the various inputs.

Apparatus 10 provides a combustion chamber having a volume that is easily and readily adjustable and controllable, and further that is free of external components. The relatively high ratio between the surface area of the combustion gate piston-facing surface and the combustion chamber volume is expected to facilitate rapid changes in the combustion chamber volume (and therefore rapid changes in the compression ratio) with only minimal movement of the combustion gate. Further, the clutter-free combustion chamber is expected to facilitate HCCI, given the lack of presence of foreign components that could otherwise interfere with the homogeneity of the fuel-air mixture, and potentially lead to the creation of hot spots that can result in pre-ignition of the charge.

The ability to use the components forming the combustion chamber walls themselves (i.e. the expansion and compression gates) to form both the combustion chamber and the expansion and compression chambers during rotation of the rotor piston is expected to provide for a more compact engine design.

Further, in most cases, processor 96 can cause the servo mechanism to shift combustion gate 62 so that piston-facing surface 70 of the combustion gate aligns with the interior stator surface, thereby reducing the respective combustion chamber volume effectively to zero. The apparatus may therefore provide a wide range of combustion chamber volumes and compression ratios between the highest point of the combustion chamber piston-facing surface (when the combustion chamber is at its largest volume) and approaching a zero volume. This ability to position the combustion gate at small gradations is expected to facilitate the ability to achieve HCCI, as greater precision in compression ratio variance may be achievable. Further, this broad range of compression ratios may allow for sufficiently high compression ratios to be established in order to facilitate the realization of HCCI at minimum engine load, at idle engine conditions, and at engine start-up, particularly when the engine or the air temperature is cold.

In some embodiments, combustion gate 62 may include recess 62*a*, shown in FIGS. 13 to 17 and 21 to 27. Recess 62*a* may be arcuate such that combustion chamber 66 remains substantially blocked off from the adjacent gates 60 and 64, as more particularly shown in FIG. 26. Because of the relatively small size of the combustion chamber across the full range of movement of the combustion gate, auto-ignition within combustion chamber 66 may still be achieved when the compression ratio is reduced (i.e., when the range of compressions available is reduced) by introducing recess 62*a*. For example, in the embodiment shown in the attached drawings, the shown combustion gate is 8 mm in width and the compression ratio is greater than 30:1. A 4 mm upward movement of the combustion gate will reduce the compression ratio to approximately 13:1. Such range of compression ratios should be sufficient to sustain HCCI within combustion chamber 66 at different operating conditions. The compression ratio may also be increased if needed. Arcuate recess 62*a* may promote charge uniformity as the combustion chamber would be substantially free of sharp corners, thereby facilitating the realization of HCCI. Further, because expansion gate 60 and compression gate 64 are substantially blocked off from combustion chamber 66 when arcuate recess 62*a* is formed in the combustion gate, the compression and expansions gates may be less exposed to the combustion event and therefore less prone to wear when arcuate recess 62*a* is formed in the combustion gate.

In embodiments not using load cells 114, apparatus 10 achieves HCCI by a passive method in which the apparatus predicts the amount of fuel and/or the compression ratio that will be required to achieve HCCI during the combustion phase. In embodiments using the load cells, the apparatus can also achieve HCCI by an active method in which the pressure levels in the combustion chamber are continuously monitored by the respective load cells. It is expected that the use of a load cell will facilitate detection of, for example, misfires (i.e., the absence of combustion) or excessive pressure levels. This additional information, provided to processor 96 in the form of combustion chamber pressure data 118, is expected to facilitate further accuracy in the determination of the optimal combustion gate position and/or amount of fuel to be injected, in order to achieve HCCI. In some embodiments, where larger engines are used and space permits, there can be a pressure transducer (not shown) installed into one or more of throughway walls 58*c* and 58*d* enclosing the combustion chamber, for improved combustion chamber pressure monitoring.

Further, the potential consequences of detonation for the system or apparatus may be less extreme than for detonation in a reciprocating engine, given the inherently, relatively stronger construction of rotary engines.

In many cases, expansion gate 60 and compression gate 64 would be constructed from durable materials that are resistant to heat, and in particular, resistant to thermal shocks (such that they can withstand combustion temperatures and forces). The materials may also be relatively light, in order to reduce the dynamic forces caused by the reciprocating motion of the gates. Suitable materials may include, but are not limited to, ceramic materials such as silicon carbide and silicon nitride, which tend to exhibit relatively lower densities, lower thermal expansion coefficients, and superior thermal shock resistance. Similar materials would also be suitable for roller bearings 208. Silicon nitride has shown generally superior fatigue performance in roller bearing applications, and a silicon carbide having a certain grade of porosity can be used to better retain the lubricant dispersed thereon.

In some embodiments, accommodation 208*a* (see, e.g., FIG. 23) formed in each of the piston-facing surfaces of the expansion and compression gates 60 and 64 may include diamond-like coating 208*b*. The diamond-like coating may improve wear resistance and reduce friction between the gates and their respective roller bearings where lubrication is lacking.

Rotor piston 12 and combustion gate 62 may also be formed from a silicon carbide, but in most cases will be formed from a Ni-resist D5S iron. The Ni-resist D5S iron is a ductile iron with low thermal expansion properties that is suitable for high temperature applications. The iron represents a less costly alternative to silicon carbide that is suitable for these components given that they are not subject to the same reciprocating motion of the expansion and compression gates. As such, dynamic forces caused, for example, by the motion of the combustion gate is relatively small, even when the combustion gate is formed from Ni-resist D5S iron.

Rotor apex seal 210 may be formed from the same material as the roller bearings (e.g., a silicon carbide with a certain level of porosity) so as to have a low coefficient of thermal expansion, low density, superior thermal shock resistance, and the ability to more effectively retain the lubricant dispersed thereon.

Stator 14 and flanges 22, 32 of the rotary engine will typically (but not necessarily) be formed from grey cast iron (FC25) for its inherent lubricity and its relatively superior handling of seizure stresses when paired with silicon carbide components. The flanges may alternately be formed from a carbon steel.

Where a ceramic material, for example silicon carbide, is used for the compression and expansion gates, roller bearings, and apex seal, and where the rotor piston and combustion gate are formed from Ni-resist D5S iron, the gates, roller bearings, rotor piston, and apex seal will all exhibit lower coefficients of thermal expansion compared to the grey cast iron stator. This is expected to permit the moving parts to operate with minimal lateral clearances. In some embodiments, these components may include lateral seals (not shown) to further seal the components in order to seal the chambers as they are formed and to help produce the pressure required for self-ignition of the charge.

Furthermore, research has shown that ceramics (such as silicon nitride, silicon carbide, and alumina) engaged in self-mated sliding may be successfully lubricated with water. As such, the fluid medium used for lubrication and sealing in lubrication and sealing mechanism 220 may be water-based where ceramics are used in the construction of the gates and roller bearings. It will be appreciated that other fluid mediums with lubricating and sealing properties, such as mineral or synthetic oils, may be used.

References herein to piston-facing surfaces 70 of the expansion and combustion gates include references to roller bearings 208 where the roller bearings are utilized. Further, references herein to contact or engagement between piston-facing surfaces 70 of the expansion or compression gates and rotor piston 12 include contact between roller bearings 208 and rotor piston 12 where roller bearings are utilized. Also, references herein to the components or parts forming the various chambers (e.g., compression, expansion, scavenging, and combustion chambers) may further include one or more roller bearings 208 where roller bearings are used (as can be seen, e.g., in FIGS. 25 to 27) and/or, where applicable, fluid film existing between surfaces. Further, it will be appreciated that references made herein to contact, engagement, slidable contact, slidable engagement, or any manner of physical communication between components or surfaces may include direct contact or, where one or more of the components are lubricated, hydrostatic, hydrodynamic and/or any other type of sealed or substantially sealed contact where a fluid film exists between the surfaces.

It will be appreciated that references herein to the walls, surfaces, parts, components (e.g., rotor piston 12, etc.), etc. forming the scavenging, expansion, combustion, and compression chambers include references to the portions of such walls, surfaces, parts, components, etc. forming such chambers, as shown in the attached drawings.

It is to be understood that what has been described are example embodiments of the invention. The scope of the claims should not be limited by the specific examples set forth above, but should be given the broadest interpretation consistent with the description as a whole.

The invention claimed is:

1. A rotary engine that regulates compression ratio by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having first and second interior throughway walls, the rotary engine comprising:

within each of the one or more combustion chamber throughways,
an expansion gate slidably received within the respective throughway and slidably engaged with and adjacent to said first interior throughway wall,
a combustion gate slidably engaged with and adjacent to the expansion gate, the combustion gate disposed adjacent the expansion gate in the operating direction and having a combustion gate piston-facing surface oriented toward the piston chamber, and
a compression gate slidably engaged with and adjacent to both the combustion gate and said second interior throughway wall, the compression gate disposed adjacent the combustion gate in the operating direction,
each of said expansion, combustion and compression gates slidable longitudinally within the respective combustion chamber throughway,
wherein rotation of the rotor piston, to a position where a respective one of said one or more lobe ends aligns with the combustion gate piston-facing surface of a respective one of said one or more combustion gates, forms a combustion chamber defined at least by a portion of interior walls of said respective expansion and compression gates, the combustion gate piston-facing surface of said respective combustion gate, a portion of the first and second throughway walls of said respective combustion chamber throughway, and said respective lobe end.

2. The rotary engine of claim 1 wherein longitudinal movement of said one of said one or more combustion gates varies the volume of the respective combustion chamber.

3. The rotary engine of claim 2 wherein said one of said one or more combustion gates is moved longitudinally within its respective combustion chamber throughway by a servo mechanism operatively associated with the combustion gate and controlled by a processor capable of reading a plurality of inputs corresponding to a plurality of operating conditions, the processor capable of executing instructions stored on a computer-readable medium, the instructions, when executed by the processor, causing the processor to cause the servo mechanism to position the combustion gate in a pre-determined manner based on the plurality of operating conditions.

4. The rotary engine of claim 3 wherein said plurality of operating conditions includes combustion gate position.

5. The rotary engine of claim 3 wherein a re-positioning of each of said respective combustion gates begins at or before an end of a respective expansion phase.

6. The rotary engine of claim 5 wherein said re-positioning of said respective combustion gate ends at an end of said respective scavenging phase or at an early portion of a respective compression phase.

7. The rotary engine of claim 1 wherein each expansion gate and compression gate of each of said one or more combustion chamber throughways moves synchronously with the rotation of the rotor piston, each of said expansion and said compression gates controlled by cam elements, the cam elements operatively associated with a transmission shaft that is axially arranged along the stator axis, the transmission shaft operatively associated with the rotor piston such that rotation of the rotor piston about the stator axis causes axial rotation of the transmission shaft and said synchronous movement of said respective expansion and compression gates.

8. The rotary engine of claim 7 further comprising, for each of said one or more combustion chamber throughways, an energy transfer mechanism to transfer kinetic energy from said respective compression gate to said respective expansion gate.

9. The rotary engine of claim 8 wherein for each of said one or more combustion chamber throughways,
   said expansion gate has an expansion gate piston-facing surface oriented toward the piston chamber, and
   said energy transfer mechanism is a hydraulic system including one or more hydraulic pistons adjacent each of said expansion and compression gates opposite their piston-facing surfaces, each of said one or more hydraulic pistons in communication with hydraulic fluid within a hydraulic fluid channel such that upward movement of said respective compression gate forces said respective one or more hydraulic pistons into said fluid channel to pressurize said hydraulic fluid causing downward movement of said hydraulic piston of said respective expansion gate to thereby facilitate downward movement of said respective expansion gate.

10. The rotary engine of claim 1 wherein each of said respective expansion and compression gates includes a distally arranged roller bearing.

11. The rotary engine of claim 10 wherein said stator and said respective expansion, combustion and compression gates include passages for the supply of lubricating fluid.

12. The rotary engine of claim 11 wherein said passages are arranged such that they remain in fluid communication with one another during said longitudinal sliding of said expansion, combustion and compression gates.

13. The rotary engine of claim 12 wherein, for each of said one or more combustion chamber throughways, said lubricating fluid circulated through said passages substantially provides a seal between:
   the first and second interior throughway walls and said respective expansion and compression gates, respectively,
   said respective expansion and compression gates and said respective combustion gate, and
   said respective roller bearings and the rotor piston.

14. The rotary engine of claim 13 wherein said lubricating fluid circulated through said passages substantially provides a seal between third and fourth throughway walls disposed opposite each other in a direction transverse to the operating direction, and said respective expansion, combustion and compression gates.

15. The rotary engine of claim 1 further comprising, for each of said one or more combustion chamber throughways, a pressure-measuring device associated with said respective combustion gate, each respective pressure-measuring device comprising a pressure sensor for measuring a pressure within the respective combustion chamber.

16. The rotary engine of claim 1 wherein each said piston-facing surface of said combustion gate includes an arcuate recess.

17. A rotary engine that regulates compression ratio by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having first and second interior throughway walls, the rotary engine comprising:
   within each of the one or more combustion chamber throughways,
      an expansion gate slidably received within the respective throughway and slidably engaged with and adjacent to said first interior throughway wall, said expansion gate having an expansion gate piston-facing surface oriented toward the piston chamber,
      a combustion gate slidably engaged with and adjacent to the expansion gate, the combustion gate disposed adjacent the expansion gate in the operating direction and having a combustion gate piston-facing surface oriented toward the piston chamber, and
      a compression gate slidably engaged with and adjacent to both the combustion gate and said second interior throughway wall, the compression gate disposed adjacent the combustion gate in the operating direction and having a compression gate piston-facing surface oriented toward the piston chamber,
      each of said expansion, combustion and compression gates slidable longitudinally within the respective combustion chamber throughway, and each of said expansion and compression gates including a distally arranged roller bearing adjacent its piston-facing surface,
   wherein said stator and said respective expansion, combustion and compression gates include passages for the supply of lubricating fluid,
   and wherein rotation of the rotor piston, to a position where a respective one of said one or more lobe ends aligns with the combustion gate piston-facing surface of a respective one of said one or more combustion gates, forms a combustion chamber defined at least by a portion of interior walls of said respective expansion and compression gates, the combustion gate piston-facing surface of said respective combustion gate, a portion of the first and second throughway walls of said respective combustion chamber throughway, and said respective lobe end.

18. The rotary engine of claim 17 wherein said passages are arranged such that they remain in fluid communication with one another during said longitudinal sliding of said respective expansion, combustion and compression gates.

19. A rotary engine that regulates compression ratio by varying combustion chamber volume, the rotary engine having a rotor piston within a stator that contains a piston chamber, the rotor piston rotatable about a stator axis within the piston chamber in an operating direction and having one or more lobe ends in slidable contact with an interior stator surface, the stator having defined therein one or more combustion chamber throughways equally spaced about the stator and communicating the piston chamber with an environment exterior to the stator, each combustion chamber throughway having first and second interior throughway walls, the rotary engine comprising:
   within each of the one or more combustion chamber throughways,
      an expansion gate slidably received within the respective throughway and slidably engaged with and adjacent to said first interior throughway wall,
      a combustion gate slidably engaged with and adjacent to the expansion gate, the combustion gate disposed adjacent the expansion gate in the operating direction and having a combustion gate piston-facing surface oriented toward the piston chamber, a compression gate slidably engaged with and adjacent to both the combustion gate and said second interior throughway wall, the compression gate disposed adjacent the combustion gate in the operating direction, and an energy transfer mechanism to transfer kinetic energy from said compression gate to said expansion gate, each of said expansion, combustion and compression gates slidable longitudinally within said respective combustion chamber throughway, wherein each said expansion gate and compression gate of each of said one or more combustion chamber throughways moves synchronously with the rotation of the rotor piston, and wherein rotation of the rotor piston, to a position where a respective one of said one or more lobe ends aligns with the combustion gate piston-facing surface of a respective one of said one or more combustion gates, forms a combustion chamber defined at least by a portion of interior walls of said respective expansion and compression gates, the combustion gate piston-facing surface of said respective combustion gate, a portion of the first and second throughway walls of said respective combustion chamber throughway, and said respective lobe end.

20. The rotary engine of claim 19 wherein for each of said one or more combustion chamber throughways, said energy transfer mechanism is a hydraulic system including one or more hydraulic pistons adjacent each of said expansion and compression gates opposite their respective piston-facing surfaces, each of said one or more hydraulic pistons in communication with hydraulic fluid within a hydraulic fluid channel such that upward movement of said respective compression gate forces said respective one or more hydraulic pistons into said fluid channel to pressurize said hydraulic fluid causing downward movement of said hydraulic piston of said respective expansion gate to thereby facilitate downward movement of said respective expansion gate.

* * * * *